United States Patent [19]

Pall

[11] 4,340,479
[45] Jul. 20, 1982

[54] PROCESS FOR PREPARING HYDROPHILIC POLYAMIDE MEMBRANE FILTER MEDIA AND PRODUCT

[75] Inventor: David B. Pall, Roslyn Estates, N.Y.

[73] Assignee: Pall Corporation, Glen Cove, N.Y.

[21] Appl. No.: 198,569

[22] Filed: Oct. 20, 1980

Related U.S. Application Data

[63] Continuation-in-part of Ser. No. 905,698, May 15, 1978, abandoned.

[51] Int. Cl.³ .............................................. B01D 31/00
[52] U.S. Cl. .............................. 210/490; 210/493.2; 210/500.2; 264/41
[58] Field of Search ............... 210/510.2, 490; 264/41, 264/162, 184; 521/64, 85, 88, 97, 184; 260/30.4 N; 528/331, 332, 335, 336, 337

[56] References Cited

U.S. PATENT DOCUMENTS

| | | | |
|---|---|---|---|
| 2,783,894 | 3/1957 | Lovell et al. | 521/64 X |
| 3,389,206 | 6/1968 | Jamison | 264/184 |
| 3,457,339 | 7/1969 | Pall et al. | 264/162 |
| 3,524,753 | 8/1970 | Sharp | 521/64 X |
| 3,876,738 | 4/1975 | Marinacuo et al. | 264/41 |
| 3,894,166 | 7/1975 | Brown et al. | 210/500 M X |

*Primary Examiner*—Frank A. Spear, Jr.

[57] ABSTRACT

A process is provided for preparing skinless hydrophilic alcohol-insoluble polyamide membranes by preparing a solution in a polyamide solvent of an alcohol-insoluble polyamide resin having a ratio $CH_2$:$NHCO$ of methylene $CH_2$ to amide $NHCO$ groups within the range from about 5:1 to about 7:1 inducing nucleation of the solution by controlled addition to the solution of a nonsolvent for the polyamide resin, under controlled conditions of concentration, temperature, addition rate, and degree of agitation to obtain a visible precipitate of polyamide resin particles which may or may not thereafter partially or completely redissolve, thereby forming a casting solution; spreading the casting solution on a substrate to form a thin film thereof on the substrate; contacting and diluting the film of casting solution with a mixture of solvent and nonsolvent liquids containing a substantial proportion of the solvent liquid, but less than the proportion in the casting solution, thereby precipitating polyamide resin from the casting solution in the form of a thin skinless hydrophilic membrane; and washing and drying the resulting membrane; the alcohol-insoluble polyamide membranes obtained by this process have the unusual property of being hydrophilic, i.e., readily wetted by water, have absolute particle removal capabilities of the order of 0.1 to 5 $\mu M$ or more, and are useful as filter media, particularly for producing bacterially sterile filtrates.

162 Claims, 10 Drawing Figures

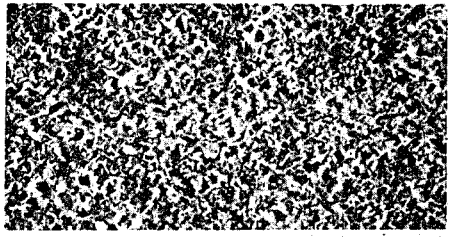
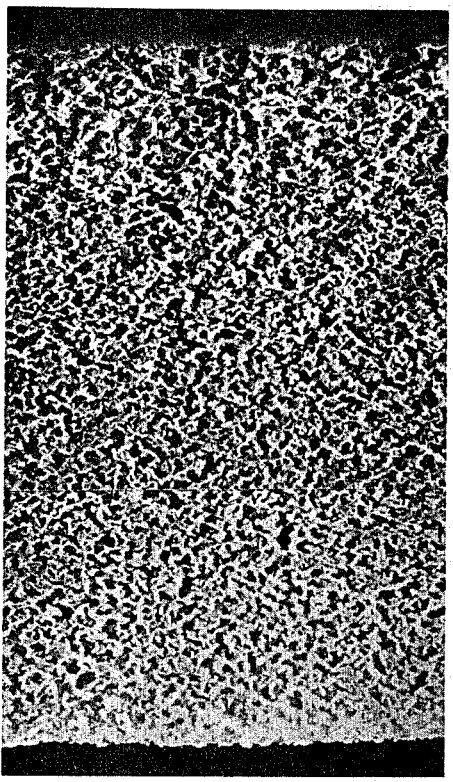
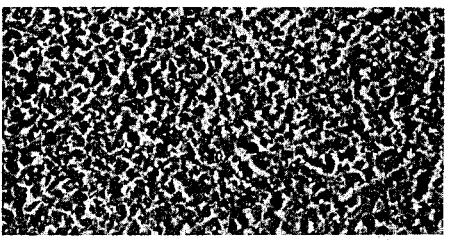
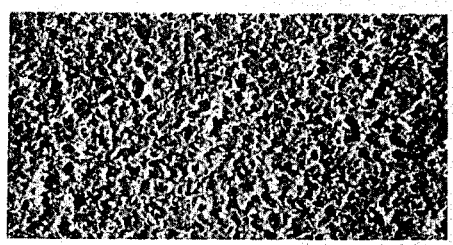
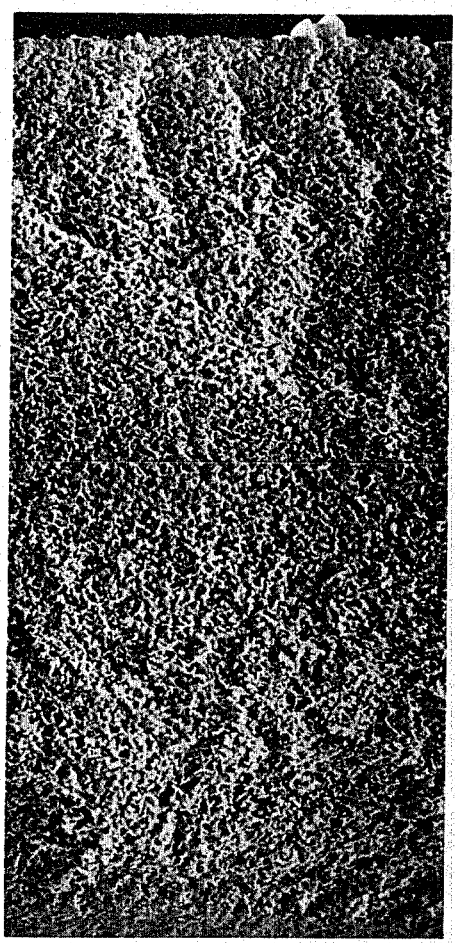
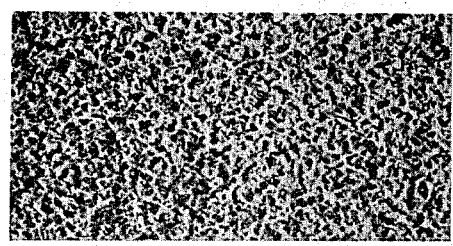
FIG. 5
1500 X
FIG. 6
1000 X

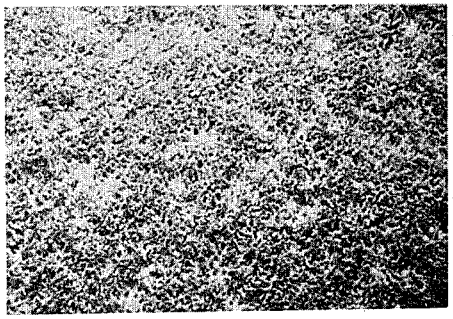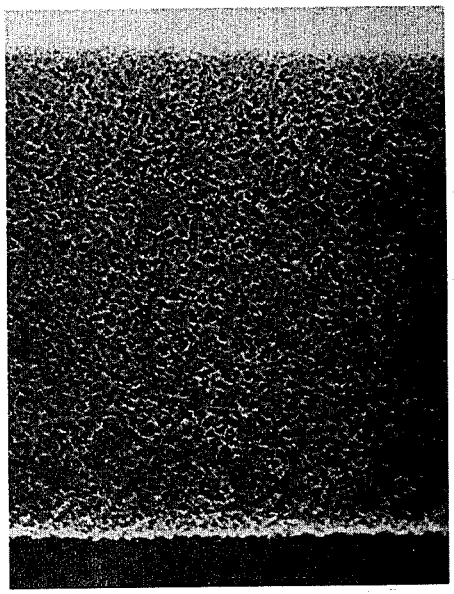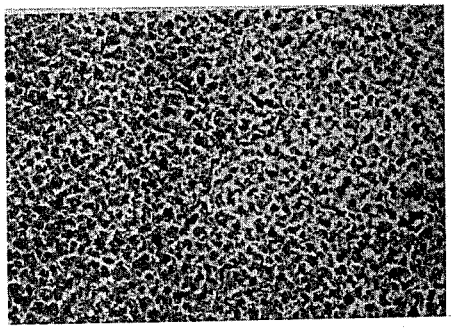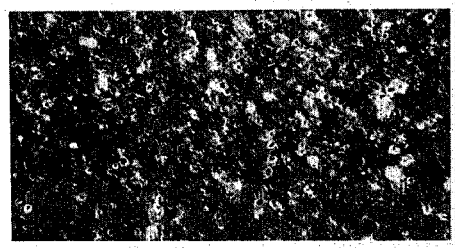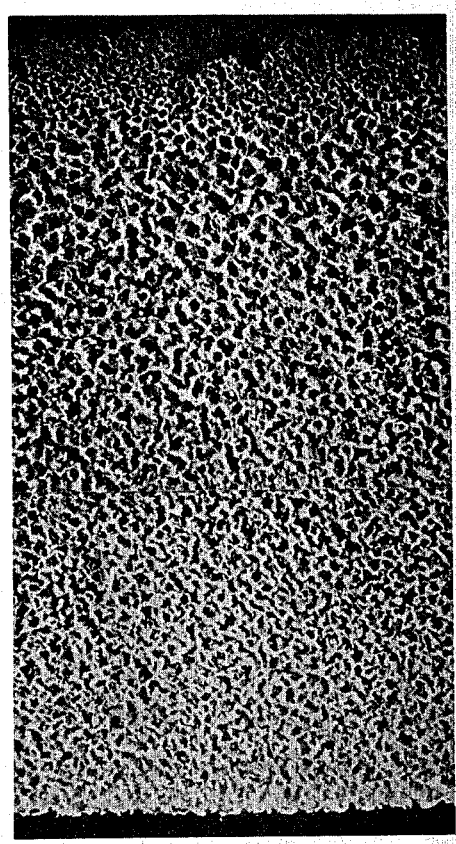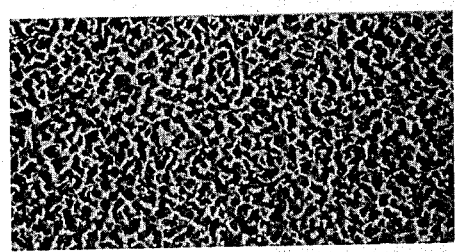
FIG. 7
1000 X
FIG. 8
1500 X

PROCESS FOR PREPARING HYDROPHILIC POLYAMIDE MEMBRANE FILTER MEDIA AND PRODUCT

This application is a continuation-in-part of Ser. No. 905,698, filed May 15, 1978, and now abandoned.

Microporous membrane sheets are available which have absolute particle removal capability in the range of about 0.1 micron and larger. These are for the most part made of synthetic resins and cellulose derivatives, and are used as filter media for removing suspended particles and micro-organisms from fluids.

Such membranes are made using the so-called "dry process" by casting a solvent solution of the resin or cellulose derivative on a temporary support or substrate as a thin film, after which the solvent is removed or exchanged under carefully controlled conditions. Solvent removal and exchange are very slow, and while the process is adaptable for continuous operation, a very large supporting belt system is required as the substrate for laydown or casting of the film, and the drying set-up to carry out removal of the solvent. This increases plant size and the capital costs in plant construction, and ensures a high cost of manufacture.

Because of the very great length of material (solution or film) which is in process at any one time, adjustment of processing conditions for close control of product characteristics is difficult. While the final product is being removed and tested for its characteristics, a very large volume of material is already in process of being formed into a membrane, and past the point where an adjustment of the process parameters to modify product characteristics, however prompt, could affect it. Thus, a considerable amount of out-of-specification membrane sheet is made before the result of a correction can be seen at the end of the production line. This results in a large proportion of membrane sheet being out-of-specification, and a wide range of product variation necessarily has to be accepted, to keep rejections at a minimum. As a consequence of high production cost and high rejection rate, the price for such membrane sheet tends to be rather high.

Another process for preparation of membrane sheets also starts from a solution of the resin or cellulose derivative, casting a film of the solution on a support, and then forming the membrane by precipitation upon immersion of the film solution in a nonsolvent for the resin. This process results in a skinned membrane, with surface portions having fewer or very much smaller pores, or even zero pores, and an interior portion with larger pores, the outer skinned portions having higher apparent density than the interior portions.

Skinned membranes are nonuniform with respect to particle removal; for example, the membranes now used for reverse osmosis are effective in accomplishing such tasks as 90% or better salt rejection, thus functioning in the 2 to 5 Angstroms (0.002 to 0.005 $\mu M$) range, but are incapable of providing sterility in the effluent, allowing bacteria in the range of 2000 Angstroms (0.2 $\mu M$) to pass. Such membranes are poorly suited when absolute removal of particular material as bacteria is needed.

Thus, for example, Michaels U.S. Pat. No. 3,615,024, patented Oct. 26, 1971, describes the formation of anisotropic membranes having pores of from 1 to 1000 $\mu M$ from a variety of synthetic resins by:

(1) forming a casting dope of a polymer in an organic solvent,
(2) casting a film of said casting dope,
(3) preferentially contacting one side of said film with a diluent characterized by a high degree of miscibility with said organic solvent and a sufficiently low degree of compatibility with said casting dope to effect rapid precipitation of said polymer, and
(4) maintaining said diluent in contact with said membrane until substantially all said solvent has been replaced with said diluent.

The submicroscopically porous anisotropic membranes consist of an integral macroscopically thick film of porous polymer, usually more than about 0.002 and less than about 0.050 inch in thickness. One surface of this film is an exceedingly thin but relatively dense barrier layer or "skin" of from about 0.1 to 5.0 microns thickness of microporous polymer in which an average pore diameter is in the millimicron range, for example from 1.0 to 1000 millimicrons, i.e., about one-tenth to one-hundredth the thickness of the skin. The balance of the integral film structure is a support layer comprised of a much more coarsely porous polymer structure through which fluid can pass with little hydraulic resistance. By "integral film" is meant continuous, i.e., a continuing polymer phase. When such a membrane is employed as a "molecular filter" with the "skin-side" in contact with fluid under pressure, virtually all resistance to fluid flow through the membrane is encountered in the "skin", and molecules or particles of dimensions larger than the pores in the "skin" are selectively retained. Because the skin layer is of such extraordinary thinness, and because the transition from the skin layer to the macroporous support structure is so abrupt, normally less than about one-half the thickness of the barrier layer or less than one micron, the over-all hydraulic resistance to fluid flow through the membrane is very low; that is, the membrane displays surprisingly high permeability to fluids in proportion to its pore size.

Michaels suggests that the formation of these anisotropic membranes appears to be related to certain diffusional and osmotic solvent-exchange processes as described hereinbelow:

When a thin layer of polymer solution deposited on a suitable substrate (to assure preferential contact of diluent with one surface) is contacted with diluent on one surface, diluent and solvent interdiffuse in the outermost layer almost instantaneously. Thus gelation or precipitation of the polymer takes place almost instantaneously. In view of the rapidity of this process, the topmost layer of the cast film solidifies as an exceedingly thin membrane skin whose porosity and pore-fineness are governed by the compatibility criteria developed above. As soon as this membrane skin is formed, however, the rate of penetration of diluent into the underlying region of the cast film, and rate of extraction of the solvent component, are greatly retarded. (It must not, however, be stopped entirely). Under these circumstances, subsequent alteration in solution composition within the film occurs quite slowly. As a result there is opportunity, when a suitable solvent is present, for slow phase-separation to occur to form a grossly microporous substructure consisting of large interconnected voids occupied by solvent/diluent solution, and an interstitial polymer matrix comprising consolidated, nearly solvent-free polymer. Hence, the formation of a highly permeable, coarsely microporous substructure is in large part due to proper selection of a solvent system for film-casting dopes and the selection of a proper diluent for coaction with the solvent system during the precipitation step.

Thus, the Michaels membranes are all skinned, and moreover, while the membranes are water-wettable as long as they are kept wet, once dried they are all hydrophobic, and difficult to wet with water, except with the aid of surface-active agents or other wetting aids.

Salemme U.S. Pat. No. 4,032,309, patented June 28, 1977, prepares polycarbonate resin membranes described as hydrophobic, evidently of very small pore size, in the ultrafiltration range. Salemme refers to Michaels U.S. Pat. No. 3,615,024 and Kimura U.S. Pat. No. 3,709,774, and states that both Michaels and Kimura utilize the general procedure of preparing a casting solution of the polymer, casting a film thereof on a smooth substrate and immersing the substrate and film in an appropriate quenching bath for the development of asymmetric structural characteristics of the completed film.

These methods differ from each other in the manner in which some of the process steps are conducted. While the Michaels patent is particularly directed to the preparation of a membrane having a microporous support layer and an integral microporous skin, Kimura is primarily interested in a film structure presenting a porous region adjacent a very thin dense nonporous layer. Kimura specifically teaches the preparation of a casting solution consisting of the polymer and two mutually miscible solvents in which the polymer is soluble to substantially different degrees. Both the Michaels and Kimura methods view the immersion (or membrane-forming) bath as one which functions as a solvent for the casting solution solvent system, functioning thereby solely to remove casting solution from the film structure.

Contrary to the Kimura process, Salemme does not employ a three-component (resin, good solvent, poor solvent) casting solution and, in contrast to both Kimura and Michaels, Salemme utilizes an immersion (quenching) bath to initiate formation of the film that must provide a function neither disclosed nor contemplated in either Kimura or Michaels; namely, causing swelling of the polycarbonate resin material at the same time as the casting solvent is removed from the film thereby.

The Salemme method for the preparation of porous polycarbonate and other resin membranes comprises the steps of:

(a) preparing a casting solution at room temperature consisting of polycarbonate resin material and a casting solvent composed of one or more good solvents, the casting solution being stable at room temperature;

(b) casting a layer of the casting solution so formed on a smooth, clean surface or support;

(c) permitting desolation to occur for a predetermined time interval from said layer;

(d) immersing said layer and support in a quenching bath liquid, the quenching bath liquid being capable of dissolving the casting solvent and causing swelling of the polycarbonate resin content of the layer while being a non-solvent for the polycarbonate resin, the immersion step initiating formation of a microporous membrane by entry of the quenching bath liquid into said layer and exit of casting solvent therefrom;

(e) removing the microporous membrane from the quenching bath; and (f) removing the remaining casting solvent and quenching bath liquid from the microporous membrane.

The microporous films produced by the Examples are said to be at least as effective for filtration as those produced in accordance with the prior art method of casting and maintaining in controlled atmosphere for extended periods. Generally, the films are said to exhibit better flow rates and to be more readily wettable than the prior art films.

The response of these microporous films is measured in terms of the foam-all-over point, which is the pressure required to cause foam to develop over the surface of the film. This method is commonly employed in this art, and is referred to as the Bubble Point. Moreover, the process for manufacture of these membranes is not susceptible of adaptation for continuous production.

A number of alcohol-insoluble polyamide resin membrane sheets have been described, but to our knowledge none has been marketed. Where sufficient information has been provided to permit duplication of the production of these membranes, they have all been heavily skinned. Membranes of alcohol-soluble polyamides have been made which are skinless, but they have to be used with media which do not contain alcohol or a number of other solvents in which they are soluble. Further, such membranes are not capable of use after steam sterilization, a highly desirable attribute for media used in large part for producing bacterially sterile filtrates. Hollow fiber membranes made of polyamide resin are marketed in commercially available equipment, but these are heavily skinned, and serve to accomplish partial separations in the reverse osmosis range.

Lovell et al U.S. Pat. No. 2,783,894, patented Mar. 5, 1957, and Paine U.S. Pat. No. 3,408,315, patented Oct. 29, 1968, provide a process for producing alcohol-soluble polyamide membrane sheets using Nylon 4, poly-$\epsilon$-butyrolactam. The term "alcohol-soluble" is used by these patentees to refer to polyamide resins soluble in lower aliphatic alcohols such as methanol or ethanol, and is so used in the present specification and claims. A solution of nylon can be cast as a liquid film and then converted to a solid film which presents a microporous structure when dried. An alcohol-water solution containing nylon is prepared and adjusted to the point of incipient precipitation. The solution is brought to the point of incipient precipitation by adding to the solution a solvent-miscible nonsolvent which decreases the solubility of the nylon. This point is indicated when a small amount of nonsolvent added to a sample of the solution causes an obvious precipitation of nylon.

The nylon solution, adjusted to the point of incipient precipitation and containing the proper additives, is cast as a liquid film on an optically smooth surface of a solid base and then converted to a solid film by exposure to an atmosphere containing a constantly maintained concentration of exchangeable nonsolvent vapors, that is, vapors of a liquid in which nylon is not soluble but which are exchangeable with vapors of the solvent for the nylon. The resulting membranes are, of course, soluble in alcohol, as well as in a considerable number of other solvents, and may not be steam sterilized, which limits the scope of their usefulness.

Hiratsuka and Horiguchi U.S. Pat. No. 3,746,668, patented July 17, 1973, also prepares membranes from alcohol solutions of polyamides which are alcohol-soluble, gelling the solution by addition of a cyclic ether as a gelling agent, and drying the film. Alcohol-soluble relatively low molecular weight copolymers of Nylon 6 and Nylon 66, and of Nylon 6, Nylon 66 and Nylon 610 are used.

Marinaccio and Knight, U.S. Pat. No. 3,876,738, patented April 8, 1975, describes a process for producing microporous membrane sheets from alcohol-soluble and alcohol-insoluble polyamides such as Nylon 6, poly-ε-caprolactam, and Nylon 610, polyhexamethylene sebacamide, by casting a solution of the polymer on a substrate and then precipitating the membrane, both steps being carried out sequentially or concurrently in a quenching bath of nonsolvent liquid.

The nylon solution after formation is diluted with a nonsolvent for nylon, and the nonsolvent employed is miscible with the nylon solution. Marinaccio et al discuss polymer molecule aggregation in solution, and assert that "the tightest or most nonporous polymer film is produced from a solution in which there is no aggregate formation."

According to Marinaccio et al, "... the resulting film strength is primarily determined by the polymer concentration because of the larger number of chain entanglements occurring at higher polymer levels. In addition, for film cast from the ideal solution the "pore size" would increase slightly with polymer concentration because of the increasing aggregation tendency at higher concentrations. Aggregation in solution results in film porosity since the film as cast can be thought to consist of interacting aggregated spherical particles. The larger the spheres, the larger the voids in the film. Structurally this is much like a box of tennis balls or other nonspherical geometrics fused at their point of contact."

As a first step, then, Marinaccio et al control film porosity by "control of the aggregation tendency in the casting solution. This is accomplished . . . by the addition of nonsolvent or other additives to change the solvent power of the solution, hence influencing and controlling the aggregation tendency of the polymer molecules. The interaction of these aggregates in determining the resulting film structure is further influenced by the various process variables previously maintained."

This is Marinaccio et al's theory, but it is not adequate to explain what actually occurs, and is in many respects not consistent without actual observations. Moreover, it differs from other more generally accepted theories advanced to explain polymer membrane formation, as for instance, *Synthetic Polymeric Membranes*, Kesting (McGraw Hill 1971) pp 117 to 157. Kesting's theory is more credible for a number of reasons; for example, it accounts for the very high voids volume of the membranes, which Marinaccio's "tennis ball" theory fails to do; further it explains why only relatively polar polymers are susceptible to membrane formation, which again Marinaccio does not.

Marinaccio et al then assert: "The selection of a solvent for a selected film-forming polymer can be made on the basis of the foregoing information. Determination of optimum solvent systems as well as other process variables can then be made on the basis of routine laboratory experimentation." However, dilution of the solution by addition of a nonsolvent has a limit: "dilution with nonsolvent can be effected up to the point of incipient precipitation of the nylon, but not beyond." The casting solutions are stable enough to be subjected to ageing periods of as much as five to eight days, and indefinitely in some cases, but not so long that the dissolved nylon separates.

The quenching bath may or may not be comprised of the same nonsolvent selected for preparation of the nylon solution, and may also contain "small amounts" of the solvent employed in the nylon solution. However, the ratio of solvent to nonsolvent is lower in the quenching bath than in the polymer solution, in order that the desired result be obtained. The quenching bath may also include other nonsolvents, e.g., water. In all of the Examples, the solvent utilized for the solutions is formic acid, but none of the quench baths contained even a small amount of formic acid.

The Marinaccio et al process is said to differ from conventional methods of preparing microporous films in using more simplified casting solutions, but more importantly in eliminating the slow equilibration step of gelling in a high humidity atmosphere. In conventional processes this is a critical step in the formation of the desired film structure. In the Marinaccio et al process the film is cast directly in the quench bath, and immediately quenched. By controlling the casting solution formulation as discussed above and controlling the quench bath variables including composition and temperature, film structure is said to be controlled. This technique forms the film structure "catastrophically" and is in direct contrast to the slow equilibrium technique needed in conventional processes.

In some cases Marinaccio et al suggest it may be desirable to pass the cast film through a short air evaporation zone prior to the quench bath. The technique could be used in those cases in which a graded cross-sectional structure is desired in the film.

The product of Marinaccio et al has not been commercialized, and is unavailable. The formation of a polymer film by direct immersion of the casting resin into a quench bath is difficult, and it has not been economically feasible to attempt to duplicate the Marinaccio et al process so that the characteristics of the product could be studied, since such a study would require constructing a rather elaborate apparatus. It is also noteworthy that none of Marinaccio et al's Examples include formation of the film in a quench bath, but instead are manually cast in individual laboratory tests onto glass plates.

Tests were run using the glass plate method described by Marinaccio et al, with delay periods between drawing the film and immersion in the bath varied from less than three seconds to as long as one minute; there was no significant difference in product characteristics. It may therefore be assumed that the film resulting from casting under the bath surface (representing extrapolation to zero time) will not be different. With this in mind, the casting resins of his Examples were formed as thin films, and with minimum delay, always under one minute, so as to allow no significant loss of solvent by evaporation, immersed into the baths described; in all cases the films obtained were heavily skinned.

A number of polyamide resin membranes have been used for reverse osmosis and ultrafiltration, but all have pore sizes below $0.1\mu$, and therefore provide flow rates below the range useful in particulate and bacteria filtration. Although the pores are small enough to remove microorganisms, such as bacteria, such membranes are not used for this purpose, but instead accomplish such tasks as reverse osmosis and ultrafiltration, which are not quantitative, and which can tolerate the imperfections which characterize skinned nylon membranes.

Steigelmann and Hughes, U.S. Pat. No. 3,980,605 patented Sept. 14, 1976, provides semipermeable membranes made from mixtures of polyamides, especially N-alkoxyalkyl polyamides, and water-soluble polyvinyl alcohols. The membranes are preferably formed as hollow fibers. The membranes can be made from compositions containing the polymer components and a di (lower alkyl) sulfoxide, e.g., dimethyl sulfoxide. The membranes may contain complex-forming metal components. The membranes are useful for separating chemicals from their mixtures by techniques using an aqueous liquid barrier and complex-forming metals, e.g., for the separation of ethylenically unsaturated hydrocarbons such as ethylene from close-boiling hydrocarbons, but such membranes have pore sizes too small to provide flow rates useful in particulate and bacteria filtration.

It is an unfortunate fact that most available membrane sheets are hydrophobic, i.e., not readily wetted by water. Synthetic resin membrane sheet has almost invariably been made of hydrophobic synthetic resin, and retains the hydrophobic characteristic of the polymer from which it has been made. The cellulose ester membranes are also hydrophobic. Of the available membrane sheets useful in the particle separation range only regenerated cellulose sheet and alcohol-soluble polyamide membrane sheet are hydrophilic, i.e., wettable by water.

Brooks, Gaefke and Guilbault, U.S. Pat. No. 3,901,810, proposed a way around this problem, by preparing ultrafiltration membranes made from segmented polymers having distinct hydrophilic portions and hydrophobic portions. Brooks et al suggest that if the casting solvent be a better solvent for the hydrophilic polymer segments than for the hydrophobic segments, the resulting film or membrane will display a gross morphology in which the hydrophilic portion of the system exists as a continuous phase while the hydrophobic portion is present as a disperse phase. The membrane system will include segregated domains of hydrophobic segments dispersed in a background of the hydrophilic polymer segments. By the same token, if a casting solution is selected such that it is a better solvent for the hydrophobic polymer segments than for the hydrophilic segments, the phase relationships in resulting films will be reversed and the film will not function as a membrane for aqueous media but will behave more as a hydrophobic film displaying virtually no water permeability.

However, this expedient merely utilizes combinations of hydrophilic and hydrophobic groups to achieve water permeability, and does not suggest a way of modifying normally hydrophobic groups to improve water permeability of hydrophobic polymers. Polyamides are not referred to by Brooks et al as acceptable membrane materials for their invention.

Yamarichi et al, U.S. Pat. No. 4,073,733, describe a hydrophilic polyvinyl alcohol hollow fiber membrane with a relatively uniform pore size distribution in the range from 0.02 to 2 microns, but these pores are not interconnected, and the product serves for separation in the dialysis (high molecular weight dissolved compound) range, rather than as a particle or bacterial filter.

Since the bulk of filter applications for membrane sheet is in the filtration of aqueous media, it is essential to obtain an adequate wetting of the sheet to facilitate filtration, but this is not easy to accomplish. Surface-active agents can be added to the medium being filtered, to enable the medium to wet the sheet sufficiently to penetrate it for filtration. However, the addition of foreign materials such as surface-active agents is not possible or desirable in many applications, as for example, in assaying bacteria, since some bacteria are killed by surface-active agents. In other applications, filtering media cannot be adulterated by the addition of surface-active agents without deleterious consequences.

Membrane sheets made of cellulose esters, which currently account for over 95% of all of the membrane sheet material sold, are inherently not water-wettable; hence surface-active agents are added for water service. Further, these membranes tend to be brittle, and to counteract this, glycerine is added as a plasticizer, but this is also undesirable, since it will leach into aqueous fluids, and poses a contamination problem which is unacceptable in many uses.

In accordance with the invention, alcohol-insoluble polyamide resin membrane sheet is provided that is inherently hydrophilic. This is a most remarkable property, inasmuch as the alcohol-insoluble polyamide resin from which the sheet is made is hydrophobic. The phenomenon occurs only with alcohol-insoluble polyamide resins having a ratio $CH_2$:NHCO of methylene $CH_2$ to amide NHCO groups within the range from about 5:1 to about 7:1. The reason why such polyamide resin membrane sheet prepared in accordance with the process of the invention is hydrophilic is not at present understood, but it appears to be due to a spatial orientation of the hydrophilic groups of the polymer chain that is fixed in the solid polymer membrane surface as a result of the precipitation process. It may be related to crystal structure or to solid structure, or to some spatial form of the NH and/or CO groups on the surface of the membrane sheet, facilitating its being wetted by water. The fact is that a drop of water placed on a dry polyamide resin membrane sheet of the invention will penetrate into the sheet and disappear within a few seconds. A sheet of the dry membrane place on the surface of a body of water will be wetted through and may even sink in the water within a few seconds. If the membrane is completely immersed in water, the membrane is wetted through in less than a second.

The capability of a membrane's or substrate's being wetted by water is determined by placing a drop of water on the membrane or substrate surface. The angle of contact provides a quantitative measure of wetting. A very high angle of contact indicates poor wetting, while a zero angle of contact defines complete or perfect wetting. The polyamide resin from which the membranes of this invention are made have a high angle of contact, and are not wetted by water.

The wettability of these membranes is not a function of retained water. Membrane specimens dried at 350° F. for 72 hours in an inert atmosphere, in vacuum, and in air, are unchanged with respect to wettability by water. If, however, they are heated to a temperature just below the softening temperature of the membrane (to heat at a higher temperature would of course destroy the membrane, since it would melt), the membrane reverts to a hydrophobic material, which is no longer wetted by water. This suggests that the hydrophilicity is a function of solid structure, and is obtained by the process of membrane formation, probably during precipitation of the membrane in the course of the process. It may be associated with crystal structure, or it may only be associated with noncrystalline or amorphous solid structure, but it does appear to be related to a physical orientation of the hydrophilic groups in the polyamide chain, which orientation is lost when the membrane film is heated to a high enough temperature to permit reorientation to a normal configuration, in which the material is hydrophobic.

It follows, of course, that during processing and drying it is important not to heat the membrane above this temperature.

A further important characteristic of the polyamide resin membrane sheets of the invention is their high flexibility. In the normal thickness range in which they are useful, in the absence of an extreme state of dryness, they can be folded back and forth on themselves several times, without harm, and without the addition of a plasticizer.

In the process of the invention, polyamide resin having a ratio $CH_2:NHCO$ of methylene $CH_2$ to amide NHCO groups within the range from about 5:1 to about 7:1 is dissolved in a polyamide resin solvent, such as formic acid; a nonsolvent is added under controlled conditions to achieve a nucleated solution, and the resulting solution cast on a substrate in the form of a film, and this film of solution is contacted and diluted with a liquid which is a mixture of a solvent and a nonsolvent for the polyamide resin. The polyamide resin thereupon precipitates from the solution, forming a skinless hydrophilic membrane sheet on the substrate, and the sheet can then be washed to remove the nonsolvent. The membrane can be stripped off of the substrate and dried, or if the substrate is porous, it can be incorporated in the membrane or attached to the membrane to serve as a permanent support, and is then dried with the membrane.

The conditions under which the polyamide resin is precipitated determine the skinless nature of the membrane, as well as its physical characteristics, i.e., the size, length and shape of the through pores of the membrane. Under certain conditions, a membrane is formed which has through pores extending from surface to surface that are substantially uniform in shape and size. Under other conditions, the through pores are tapered, being wider at one surface and narrowing towards the other surface of the membrane.

Under conditions outside the scope of the invention, still another form of the membrane is obtained, having a dense skin penetrated by pores of smaller diameter than the pores in the remainder of the sheet. This skin is normally on one side of the membrane sheet, but it can be on both sides of the membrane sheet. Such skinned membranes are conventional in the art, exhibit relatively higher pressure drop and other poor filtration characteristics, and are undesirable.

Thus, by control of the method by which the casting resin is nucleated, and of the precipitation conditions, it is possible to obtain hydrophilic polyamide resin membranes with through pores of desired characteristics, either uniform from face to face, or tapered, with larger pores on one face transitioning to finer pores on the other face.

The formation of a polyamide membrane having uniform pores or tapered pores without a skin on either surface is also remarkable. As shown by the Michaels U.S. Pat. No. 3,615,024, and Marinaccio et al U.S. Pat. No. 3,876,738, precipitation of a polyamide resin membrane in a nonsolvent is known to result in a skinned membrane. The formation of a hydrophilic skinless polyamide resin membrane by this process has not previously been achieved.

The process of the invention for preparing from hydrophobic polyamide resin a skinless microporous polyamide membrane having absolute particle removal ratings of 0.10 $\mu M$ to 5 $\mu M$ or larger in a solid form that is hydrophilic and remains hydrophilic until heated to a temperature just below its softening point comprises preparing a solution in a polyamide solvent of an alcohol-insoluble polyamide resin having a ratio $CH_2:NHCO$ of methylene $CH_2$ to amide NHCO groups within the range from about 5:1 to about 7:1, inducing nucleation by dilution of the solution with a nonsolvent liquid under controlled conditions of solvent and nonsolvent and resin concentration, temperature, mixing intensity, addition time and system geometry such that a visible precipitate of polyamide resin forms during the addition of the nonsolvent, with or without visibly complete redissolution of the precipitated polyamide resin; removing any undissolved resin by filtration; spreading the resulting solution on a substrate to form a thin film thereof on the substrate; contacting the film with a mixture of nonsolvent liquid containing a substantial proportion of solvent for the polyamide resin, thereby precipitating polyamide resin in the form of a thin skinless hydrophilic membrane; and washing and drying the resulting membrane.

In a preferred embodiment of this process, the solvent for the polyamide resin solution is formic acid and the nonsolvent is water, and the polyamide resin solution film is contacted with the nonsolvent by immersing the film carried on the substrate in a bath of nonsolvent comprising water containing a substantial proportion of formic acid.

The invention in another preferred embodiment provides a process for preparing skinless hydrophilic alcohol-insoluble polyamide membrane sheets having pores that are substantially uniform from surface to surface, which comprises preparing a solution in a polyamide solvent of an alcoholinsoluble polyamide resin having a ratio of $CH_2:NHCO$ of methylene $CH_2$ to amide NHCO groups within the range from about 5:1 to about 7:1, inducing nucleation by dilution of the solution while controlling solvent and nonsolvent and resin concentration, temperature, mixing intensity, addition time and system geometry to obtain a visible precipitate of polyamide resin during the addition of the diluent, with or without visually complete redissolution of the precipitated polyamide resin, thereby forming a casting solution; removing any undissolved resin by filtration, spreading the casting solution on a substrate which is nonporous and whose surface is wetted by the casting solution and preferably also by the nonsolvent-solvent mixture to form a thin film thereof on the substrate, contacting the film with a mixture of nonsolvent liquid containing a substantial proportion of solvent for the polyamide resin, thereby precipitating polyamide resin in the form of a thin skinless hydrophilic membrane, and washing and drying the resulting membrane.

Further, a continuous process is provided for preparing skinless hydrophilic alcohol-insoluble polyamide membrane sheets which comprises preparing a solution in a polyamide solvent of an alcohol-insoluble polyamide resin having a ratio $CH_2:NHCO$ of methylene $CH_2$ to amide NHCO groups within the range from about 5:1 to about 7:1, inducing nucleation by dilution of the solution with a nonsolvent while controlling solvent and nonsolvent and resin concentration, temperature, mixing intensity, addition time and system geometry to obtain precipitation of polyamide resin during the addition of the nonsolvent, with or without visually complete redissolution of the precipitated polyamide resin, thereby forming a casting solution; removing any undissolved resin by filtration; spreading the casting solution on a substrate which is nonporous and whose surface is wetted by the casting solution and preferably also by the nonsolvent-solvent mixture to form a thin film thereof on the substrate; contacting the film with a bath of nonsolvent liquid containing a substantial proportion of solvent for the polyamide resin, thereby precipitating polyamide resin in the form of a thin skinless hydrophilic membrane; and continuously washing and drying the resulting membrane, while maintaining constant the relative proportion of solvent and nonsolvent liquid in the bath. In a preferred embodiment, the rates of withdrawal and addition of solvent and nonsolvent to and from the bath are maintained substantially constant.

The invention further provides a process for preparing skinless hydrophilic alcohol-insoluble polyamide membrane sheets having multimembrane layers, which comprises preparing at least two starting solutions in a polyamide solvent of alcohol-insoluble polyamide resin having a ratio $CH_2:NHCO$ of methylene $CH_2$ to amide NHCO groups within the range from about 5:1 to about 7:1, inducing nucleation by dilution of the solutions with a nonsolvent while controlling solvent and nonsolvent and resin concentration, temperature, mixing intensity, addition time and system geometry to obtain a visible precipitate of polyamide resin during the addition of the nonsolvent, with or without visibly complete redissolution of the precipitated polyamide resin; removing any undissolved resin by filtration; spreading the resulting solution on a substrate which is nonporous and whose surface is wetted by the casting solution and preferably also by the nonsolvent-solvent mixture to form a thin film thereof on the substrate; contacting the film with a mixture of nonsolvent liquid containing a substantial proportion of solvent for the polyamide resin, thereby precipitating polyamide resin in the form of a thin skinless hydrophilic membrane; washing the resulting two membranes; combining the two membranes so formed as a dual layer; and drying the dual layer under conditions of restrain to prevent more than minor reduction of the length and width of the membrane; the membranes so dried forming a single sheet with particle removal characteristics superior to those of the individual layers.

The membranes thus attached can have the same or differing porosities, and the membrane layers can be selected from membranes having tapered pores and membranes having uniform pores, in any combination, supported or unsupported.

The two combined membranes can be obtained from a single roll of filter medium, and when combined with matching faces in contact form a sheet which is symmetrical, and which provides equal filtration characteristics regardless of which face is upstream.

The invention also provides several types of polyamide resin membrane products. One preferred embodiment is a hydrophilic microporous polyamide membrane comprising a normally hydrophobic polyamide resin having a ratio $CH_2:NHCO$ of methylene $CH_2$ to amide NHCO groups within the range from about 5:1 to about 7:1 in a solid structure that is hydrophilic, having absolute removal ratings within the range from about 0.1 μM to about 5 μM, and a thickess within the range from about 0.025 mm to about 0.8 mm.

These hydrophilic microporous polyamide resin membranes can have pores extending from surface to surface in a relatively uniform structure, or in a tapered pore structure.

Also provided are hydrophilic polyamide resin membranes that are supported by the substrate on which the polyamide resin membrane is formed, either imbedded therein, or having the substrate attached to one face thereof.

In addition, the invention provides microporous polyamide resin membrane composites having a plurality of polyamide resin membrane layers, formed of membranes prepared separately by precipitation on separate substrates and then bonded together by drying two or more layers maintained in close contact.

In all of these embodiments, the polyamide resins having a ratio $CH_2:NHCO$ of methylene $CH_2$ to amide NHCO groups within the range from about 5:1 to about 7:1 include polyhexamethylene adipamide (Nylon 66), poly-ε-caprolactam (Nylon 6), polyhexamethylene sebacamide (Nylon 610), poly-7-aminoheptanoamide (Nylon 7), polyhexamethylene azeleamide (Nylon 69), and mixtures of two or more thereof, as well as mixtures thereof with higher polyamide homologues such as polyhexamethylene dodecandiamide (Nylon 612) in proportion such that the mixture has an average of $CH_2:NHCO$ ratio within the stated range. The first three polyamides, Nylon 66, Nylon 6 and Nylon 610, are preferred.

Another purpose of the invention is to provide a procedure for quantitative characterization of uniform pore membranes for their ability to provide sterile effluent when challenged by a stated number of a given microorganism. This procedure is applicable to uniform pore distribution membranes made of other than polyamide resins, and using other processes.

is plotted against air pressure applied. The quantity $K_L$ is defined by the broken line of FIG. 3.

Figure 4:
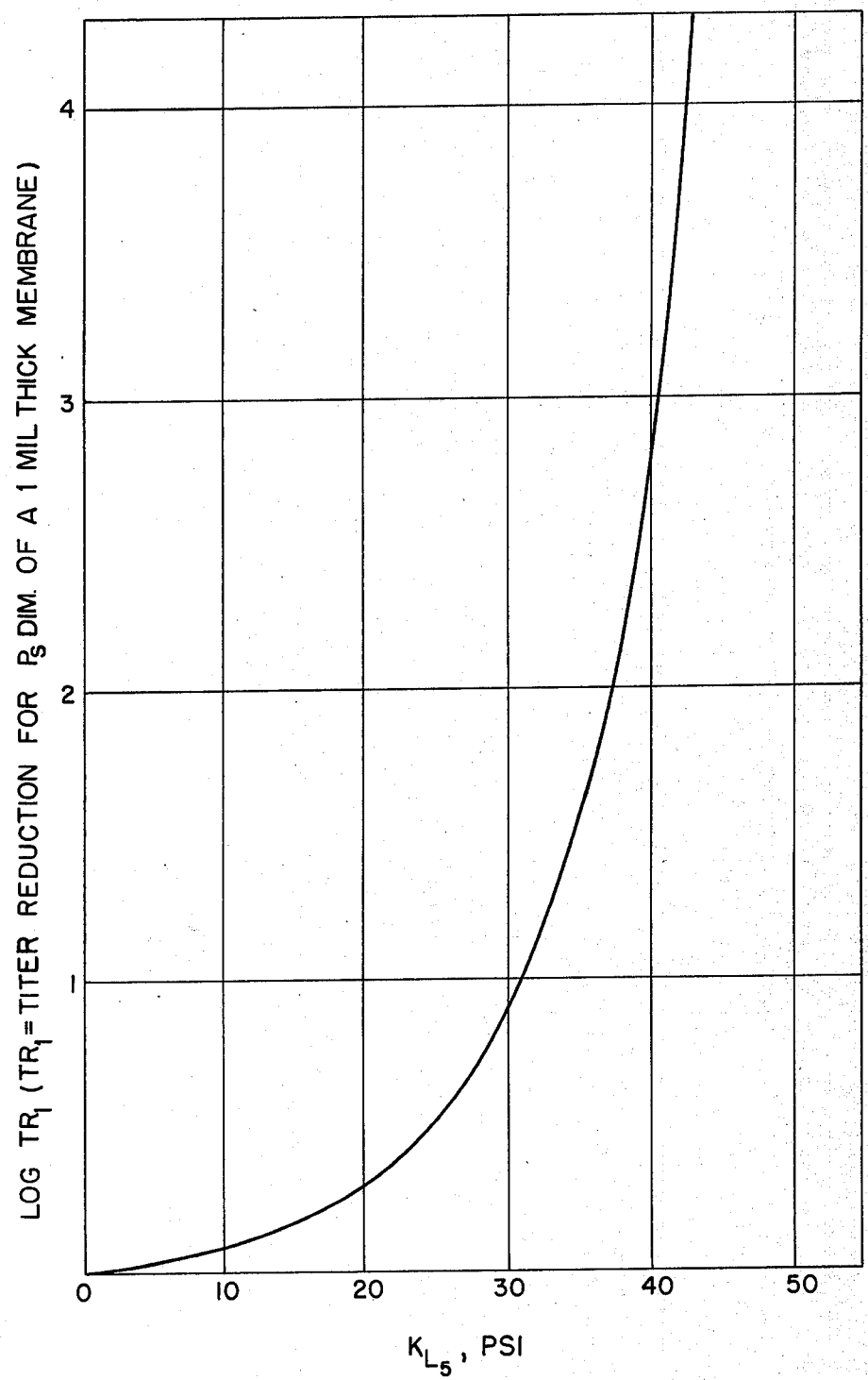

FIG. 4 is a graph showing the relation between $T_{R1}$ and $K_L$, where $$T_{R1} = T_R \frac{1}{t}$$

$$\left(\text{or, Log } T_{R1} = \frac{1}{t} \text{ Log } T_R \right)$$

where t is the thickness, in thousands of an inch, of the uniform pore membrane which shows a titer reduction, as defined above, equal to $T_R$; and $T_{R1}$ is the calculated titer reduction for a 0.001 inch thick membrane of equal pore size;

$K_L$ is the pressure, measured in psi, at which air flow through the water wet membrane increases very sharply (see FIG. 3); and $K_{L5}$ is the value of $K_L$ corrected to correspond to that of a membrane 0.005 inch thick, using the empirically determined correction factors listed in Table I.

TABLE I

| Measured Thickness inch | Correction factor |
|---|---|
| 0.002 | 1.10 |
| 0.003 | 1.044 |
| 0.004 | 1.019 |
| 0.005 | 1.000 |
| 0.006 | 0.985 |
| 0.008 | 0.962 |
| 0.010 | 0.946 |
| 0.015 | 0.920 |

The curve of FIG. 4 represents the results of measuring the $K_L$ and $T_R$ for forty-five different specimens made by the process of this invention.

FIG. 5 is a scanning electron micrograph (SEM) at 1500× magnification of a membrane with uniform pores, made by the process of this invention, having a $K_{L5}$ of 47 psi, t=0.0037 inch, and an estimated $T_R$ of $3 \times 10^{18}$ for *Pseudomonas diminutiae* organism. The center portion of this micrograph shows a section through the thickness of the membrane, in which the pore sizes are seen to be uniform from surface to surface. The upper and lower micrographs show the upper and lower surfaces respectively adjacent to the section, and the pore size at each of these surfaces may also be seen to be equal.

FIG. 6 is a scanning electron micrograph at 1000× magnification of another membrane with uniform pores made by the process of this invention, having a $K_{L5}$ of 40 psi, t=5.6 mils, and an estimated $T_R$ $8 \times 10^{15}$ for *Pseudomonas diminutiae* organism. Similar to FIG. 5, the center portion is a section through the membrane showing uniform pore size from surface to surface, and the upper and lower views show the adjacent upper and lower surfaces, again indistinguishable with respect to pore size.

FIG. 7 is a scanning electron micrograph at 1000× magnification of a membrane with tapered pores made by the process of this invention. This membrane is 81 $\mu$M (0.0032 inch) thick, and the upper portion of the section may be seen in the central part of the SEM to be considerably smaller in pore diameter than the adjacent material, with the pore diameter gradually transitioning to the larger size. Comparing the top and bottom views, the pore diameters in the upper surface are substantially smaller than those on the lower surface.

FIG. 8 is a scanning electron micrograph at 1500× magnification of a lightly skinned membrane, of the type obtained when baths outside of the range of this invention are employed.

Figure 9:
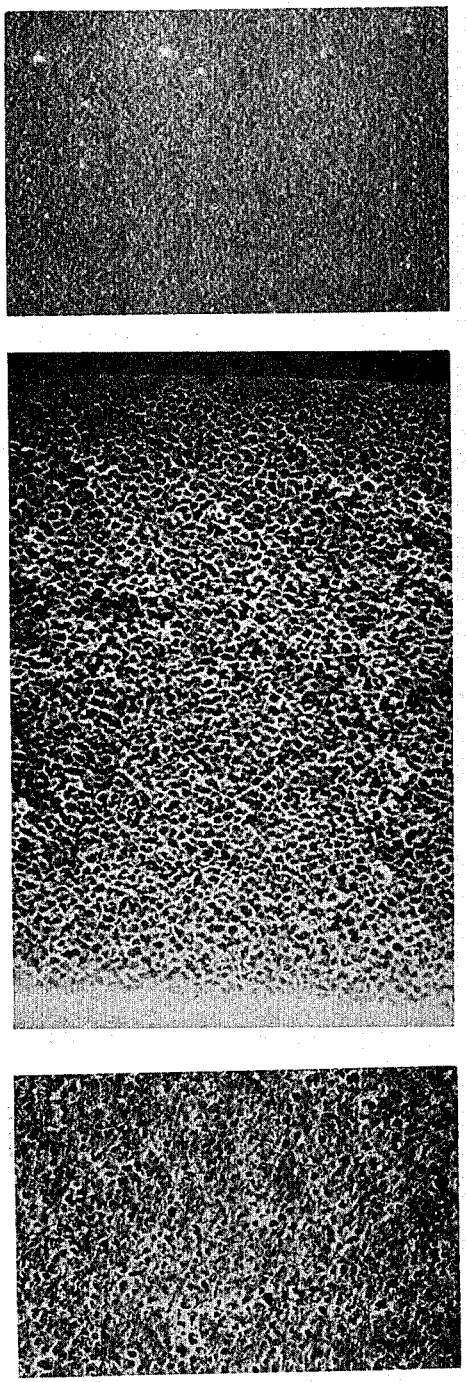

FIG. 9 is a similar micrograph of a more heavily skinned membrane.

Figure 10:
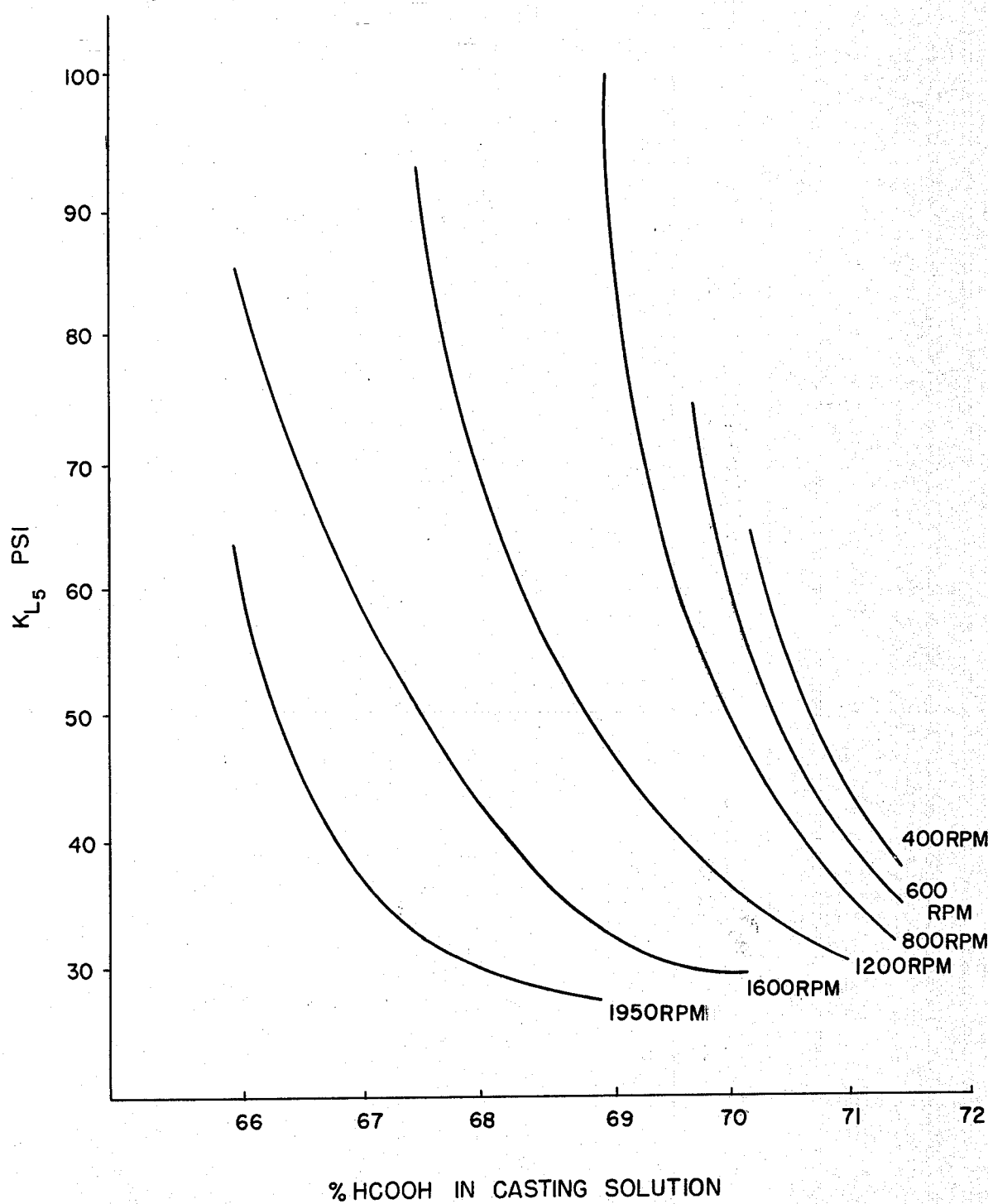

FIG. 10 is a graphical representation of the relationship between (a) $K_{L5}$, a particle removal rating parameter of membranes made by the process of this invention, defined by this invention;

(b) the mixing intensity, expressed as revolution per minute (rpm) of the in-line mixer used to process a 15.5% solution of resin in 98.5% formic acid to obtain the casting solution used to produce the membranes; and (c) the formic acid concentration of the resulting casting solution.

While the various polyamide resins are all copolymers of a diamine and a dicarboxylic acid, or homopolymers of a lactam of an amino acid, they vary widely in crystallinity or solid structure, melting point, and other physical properties. It has been determined in accordance with the invention that the process of the invention is applicable only to polyamides having a ratio $CH_2:NHCO$ of methylene $CH_2$ to amide NHCO groups within the range from about 5:1 to about 7:1 exemplified by the polyamides enumerated previously. The preferred members of this group, copolymers of hexamethylene diamine and adipic acid (Nylon 66), to copolymers of hexamethylene diamine and sebacic acid (Nylon 610), and to homopolymers of poly-$\epsilon$-caprolactam (Nylon 6), readily produce skinless hydrophilic alcohol-insoluble polyamide resin membranes. For reasons which are not understood, all members of this limited class of polyamide resins are quite susceptible to precipitation under the process conditions of the invention to form hydrophilic membrane sheets.

These polymers are available in a wide variety of grades, which vary appreciably with respect to molecular weight, within the range from about 15,000 to about 42,000, and in other characteristics. The formation of a hydrophilic membrane appears to be a function not of these characteristics, but of the chemical composition of the polymer, i.e., the spacing and arrangement of the units composing the polymer chain. The especially preferred species of the units composing the polymer chain is polyhexamethylene adipamide, and molecular weights in the range above about 30,000 are preferred. Polymers free of additives are generally preferred, but the addition of antioxidants or similar additives may have benefit under some conditions; for example, addition of the antioxidant Ethyl 330 (1,3,5-trimethyl-2,4,6-tris [3,5-di-tert-butyl-4-hydroxy benzyl]benzene) has been shown to extend the life of polyamide membranes exposed to extreme oxidative hydrolytic conditions.

The polyamide resin solution from which the polyamide membrane film is precipitated can be a solution in any solvent for the polymer. These solvents are well known, and are themselves no part of the instant invention. A preferred solvent is formic acid at any temperature from its freezing point to its boiling point. Other suitable solvents are: other liquid aliphatic acids such as acetic acid and propionic acid, and halogenated aliphatic acids such as trichloroacetic, trichloropropionic, chloroacetic acid, dichloroacetic acids, phenols such as phenol, the cresols, and their halogenated derivatives; inorganic acids such as hydrochloric, sulfuric, hydrofluoric and phosphoric; saturated aqueous or alcohol solutions of alcohol-soluble salts such as calcium chloride, magnesium chloride and lithium chloride; hydroxylic solvents including halogenated alcohols (trichloroethanol, trifluoroethanol), benzyl alcohol, and polyhydric alcohols such as ethylene glycol, propylene glycol, and glycerol; and polar aprotic solvents such as ethylene carbonate, diethyl succinate, dimethyl sulfoxide and dimethyl formamide.

The polyamide resin solution, hereafter referenced as the starting resin solution, is prepared by dissolution of the polyamide resin to be used in the membrane in the desired solvent. The resin can be dissolved in the solvent at ambient temperature, but a higher temperature may be used to accelerate dissolution.

If the starting resin solution is to be stored for more than a few hours, water in excess of about 1 to 2% should not be present, as otherwise a slow hydrolysis of the polyamide resin takes place, resulting in an undesirable reduction in molecular weight of the polyamide. In general, the amount of water in this event should be less than 2%, and preferably the solution is water-free. If water or formic acid-water mixture is added to accomplish nucleation, it can be added just prior to casting, preferably within about five to sixty minutes of the casting operation.

The casting resin solution is prepared from the starting resin solution by diluting it with a nonsolvent, or with a mixture of solvent and nonsolvent. The state of nucleation of the resulting casting resin solution is strongly affected by the following factors:

(1) Concentration, temperature and molecular weight of the starting resin solution;
(2) Composition and temperature of the nonsolvent, or of the nonsolvent-solvent mixture.
(3) The rate at which the nonsolvent, or nonsolvent-solvent mixture, is added.
(4) The intensity of mixing during the addition.
(5) The geometry of the apparatus in which the mixing is accomplished.
(6) The temperature of the resulting casting resin solution.

The casting resin solution so prepared is then formed into a thin film by casting it onto an appropriate substrate, and the film is immersed with minimum delay into a bath containing a nonsolvent for the polyamide resin, together with a substantial proportion of solvent for the resin. If the nonsolvent in the bath is water, and if the solvent is formic acid, the presence of at least about 20% and usually of at least 30 to 40% of formic acid is desired to prevent formation of a skinned membrane, which occurs at lower concentrations of formic acid.

The stability of the casting resin solution varies greatly depending on the method used to prepare it. For example, casting resin solution prepared under small scale batch conditions tends to be relatively unstable; for example, the characteristics of the membranes it produces will be quite different if it is cast as long as five to ten minutes after it has been prepared, or it may transform to a noncastable semi-solid gel within 10 minutes or less. On the other hand, casting resin solution prepared using a continuous in-line mixer, which can produce a membrane of equal characteristics, tends to be stable for a period of an hour or more. Casting resin solutions prepared in this way should, however, be used within an hour or less, particularly if maintained at elevated temperature, to prevent substantial reduction in molecular weight of the polyamide resin which will otherwise occur due to the presence of water in the acid solution, with resultant hydrolysis.

Either of the above methods may be used to produce casting resin solutions which function equally when cast as membranes, and regardless of which is used the addition of the nonsolvent is accompanied by the appearance of a visible polyamide resin precipitate, in order to produce a useful, properly nucleated casting resin solution. Casting resin solutions prepared by other means, for example, by dissolving the resin pellets in a solution of formic acid and water, or by adding the nonsolvent in a manner such as not to produce such a precipitate, do not produce useful membranes.

Useful membranes are those with uniform or tapered pore structures, skinless, with permeabilities to air and water such that substantial quantities of fluids can be passed at low pressure differentials, while providing a required degree of filtration. A convenient index of usefulness may be obtained by considering the permeabilities to air and to water of uniform pore cellulose ester membranes now on the market made by the so-called dry (evaporative) process. These are shown in Table II under, together with typical permeabilities of similar range media made by the process of this invention.

TABLE II

| Typical Flow Rates of Useful Membranes | | | |
|---|---|---|---|
| Absolute removal rating micrometers | Flow per sq. ft. per psid | Commercial cellulose ester membranes | Polyamide membranes of this invention |
| 0.1 | gpm H$_2$O | 0.04 | 0.17 |
|  | cfm air | 2.4 | 2.5 |
| 0.22 | gpm H$_2$O | 0.38 | 0.57 |
|  | cfm air | 8.0 | 8.4 |
| 0.45 | gpm H$_2$O | 1.0 | 1.0 |
|  | cfm air | 17 | 17 |

Membranes having significantly lower flow capacities for equal removal characteristics, when compared with currently marketed membranes, are not widely commercially acceptable, and have been defined, for purposes of this discussion, to be out of the useful range.

It is an important feature of this invention, that the conditions are described for achieving a casting solution with controlled degree of nucleation to make membranes with useful pressure drop characteristics.

We use herein the terms "nucleation" and "state of nucleation" to account for the discovery that (a) casting resin solutions can be prepared with a wide variation of composition with respect to resin, solvent, and nonsolvent concentrations, which yield identical or nearly identical membranes; and
(b) casting resin solutions can be prepared, which have equal resin, solvent and nonsolvent concentrations, which are then cast at equal temperatures into the same bath, yet yield very different membranes; in fact, the resulting membranes can run the gamut from "not useful" in the sense of having very significantly lower flows-by factors of 2 to 5 or more- compared with Table I, through the range from 0.1 $\mu$M absolute or coarser, producing membranes in all those ranges with good flow capacities, for example, equal to those listed on Table II.

Since the preparation of casting resin solutions capable of producing membranes with flow properties in the useful range has been observed to invariably be accompanied by the local precipitation and at least partial redissolution of solid resin, and since it is well known to those familiar with the chemical arts that the characteristics of a solid precipitated from solution can be greatly influenced by the presence or absence of submicroscopic nuclei, we have chosen to use the term "state of nucleation" to distinguish casting solutions having equal composition, but diverse results, as described in paragraph (b) above, and to account as well for the observation of paragraph (a).

The assumption that nucleation accounts for the differences in behavior of membranes made from casting resin solutions of equal composition is confirmed by the results of an experiment in which a stable casting resin solution was prepared, with a degree of nucleation controlled to yield a 0.4 μM absolute membrane. A portion of the casting resin solution was subjected to fine filtration to determine whether nucleation behavior would be affected, and the properties of membranes cast from the two lots of casting resin solution were compared.

Examples 58 and 59 show the results of this experiment; product characteristics are greatly altered by fine filtration; the finely filtered casting resin solution produces a membrane with a very poor ratio or flow capacity to removal rating; the Δp of sample No. 59 is more than three times higher than that for a similar membrane made using a properly nucleated casting resin solution of this invention.

This result supports the theory that resin nuclei are developed during the controlled-condition dilution used to prepare the casting resin solution, whose number, size, or other characteristics strongly influence the characteristics of the membrane generated by that casting resin solution, and that at least a portion of these nuclei were removed by fine filtration.

It should, however, be understood that we have not unquestionably established that nucleation is the only explanation for the observed results, and that they could be caused by phenomena other than nucleation.

The viscosity of the casting resin solution is preferably adjusted to between about 500 centipoises and 5000 centipoises at the temperature existing at the time it is cast as a film. Viscosities below about 500 cp allow some of the cast film to float off as a liquid to the surface of the bath, when it forms a filmy precipitate, thereby adversely affecting cast membrane properties and fouling the bath. Viscosities much above 5000 cp, for example, 100,000 cp, are not needed to obtain a smooth, coherent cast film, but are helpful in casting membranes where no substrate is used, for example, hollow fibers, or unsupported film.

Solutions of a viscosity well above 5000 cp at the casting temperature can be cast without difficulty, however, the preferred viscosity limit is about 5000 cp, since at higher viscosities the energy input to the mixture when a nonsolvent is blended with the polyamide resin solution is very high, with the result that the solution can reach excessively high temperature, with ensuing operating problems. Moreover, the pumping of the starting polyamide resin solution to the casting operation becomes progressively more difficult, as viscosity increases. Also, manipulation of the casting resin solution within the reservoir from which the resin is cast as a film on the substrate becomes troublesome, if the viscosity is very high. When a porous substrate is used, with the intention of completely impregnating it with casting resin solution, viscosities much above about 3000 cp can cause improper penetration, and the resulting product has undesirable voids.

The temperature of the casting resin solution is not critical, and useful membranes have been made over the range from about 85° C. downward. Under some circumstances, somewhat higher flow rates relative to removal rating are obtained by reducing the resin temperature to a lower value prior to casting the films.

After the cast film of liquid enters the bath, a precipitation process occurs, whose mechanism is not completely understood. The nonsolvent mixture of the bath diffuses into the cast film, and the solvent mixture in the casting resin solution diffuses out of the film into the bath, but it is not understood why this results in a uniform pore size throughout the thickness of the film when the bath solvent-nonsolvent ratio is held within certain limits.

If the bath contains only nonsolvent (such as water, alcohols or organic esters), or nonsolvent with a small proportion of solvent (e.g. water with less than 15 to 20% of formic acid) precipitation occurs very rapidly, and the solid membrane is formed within a few seconds, typically in less than 1 to 10 seconds. Membranes made in this manner are heavily skinned, regardless of the mode of preparation of the casting resin solution, and are undesirable.

If the bath contains about 43 to 55% of formic acid in aqueous solution, and the casting resin solution is properly nucleated as described herein, the resulting membrane will be uniform in pore structure from face to face, provided only that if cast on a solid substrate, the surface of that substrate be wetted by the casting resin solution and by the bath solution. The time required for the film to form under these circumstances is a function of the following:
(a) Casting resin solutions which produce membranes which have high $K_L$ values (e.g. in excess of 100 psi) set very rapidly, e.g. in less than 10 seconds. Less highly nucleated casting resin solutions, producing membranes with $K_L$ values of about 40 to 50 psi will typically set in the 10 to 20 second range, and the setting time continues to increase as $K_L$ decreases, such that membranes about 0.006 inch thick with $K_L$ values of under 20 psi require about 5 minutes or more to set, and still lower $K_L$'s require still longer periods.
(b) Thickness of the cast film is an important parameter, setting times being shorter for thin films.
(c) Use of lower casting resin solution temperatures results in faster setting.
(d) Setting is faster at the low end of the 43 to 55% recommended range, and can be further speeded by use of bath concentrations of less than 43% formic acid, at the cost of only slight deviation from pore uniformity.

As the bath concentration decreases to and below the 40 to 43% range, the membranes become progressively more asymmetric, progressing from uniform as shown in FIGS. 5 and 6, to tapered pore as shown in FIG. 7, to skinned as shown in FIG. 8, to heavily skinned as shown in FIG. 9. Operation at formic acid concentrations much lower than those producing tapered pores as exemplified by FIG. 7 is undesirable.

The formation of the membrane from a casting resin solution can be carried out as an intermittent or batch operation or as a continuous or semicontinuous process. A small scale operation may be most conveniently carried out as a batch operation, while at high production rates a continuous or semicontinuous operation is more convenient. In all types of processes, it is important to carefully control all of the operating parameters to ensure a uniform product, including operating temperatures, and relative proportions of resin solution and nonsolvent liquid. The control of conditions of non-solvent addition are particularly important, including the geometry of the apparatus, the rates of flow, and duration and intensity of mixing; also the interval between nonsolvent addition and casting of the resin film must be controlled. Such controls can be established by trial and error experimentation without undue difficulty by those skilled in this art, taking. into account the following considerations:

It is important that the casting resin solution be clear, and free from suspended material, before being spread upon the substrate to form a film. If suspended material is present, such as undissolved resin particles, these are removed by screening or filtration before casting.

Any type of substrate or support can be used as a surface on which the casting resin solution is cast to form the solution film. If a nonsupported membrane film is the desired product, then the substrate should have a surface to which the membrane does not adhere, and from which the membrane film can readily be stripped at the conclusion of the drying operation. Strippability usually requires that the substrate surface be smooth-surfaced, and nonporous. When the solvent is one with a relatively high surface tension, such as formic acid, and the nonsolvent also has a relatively high surface tension (as, for example, water), it is important that the nonporous surface on which the film is cast be wettable, i.e., have zero or near zero angle of contact, when contacted by the casting resin solution, and preferably also by the bath as well. Failing this condition, a skin will form on the membrane on the substrate side, with undesirable effect on membrane properties. Such temporary substrate or support surfaces can be of a suitable material, such as glass, metal or ceramic. Plastics, such as polyethylene, polypropylene, polyester, synthetic and natural rubber, polytetrafluoroethylene, polyvinyl chloride, and similar materials are not inherently suitable, as they are not wetted by the casting resin and nonsolvent, but these can be rendered suitable by application of an appropriate oxidative or similar surface treatment. A corona discharge can, for example, be used to treat Mylar (polyester) film, and polypropylene. The substrate can be made of or merely surfaced with such materials.

If the substrate is to form a part of the final membrane film, as a permanent supporting layer, then it should be of porous material that preferably is wetted by the casting resin solution, so that the casting resin solution will penetrate it during the casting of the solution on the substrate, and become firmly attached thereto during precipitation of the polyamide membrane film. It is not essential however that the substrate be wetted; if it is not wetted, the polyamide resin film will be largely confined to the surface of the support, but is nonetheless adherent thereto. Such substrates can, for example, be of nonwoven or woven fibrous material, such as nonwoven mats and bats, and woven textiles and cloth, as well as netting of various types, including extruded plastic filament netting, papers, and similar materials.

As permanent supports which are not wetted by the casting resin solution, fine-pored nonwoven webs can be used, made from fibers with poor wetting characteristics, such as, for example, polypropylene or polyethylene. The resin solution is cast as a film onto the nonwoven web, and since it does not wet the fibers of the web, it is carried on its surface. The substrate carrying the casting resin solution film on its lower surface is plunged into a bath of nonsolvent liquid or allowed to float on the surface of the bath, and the membrane film precipitated onto the substrate. The resulting film has good adhesion to the substrate, and the substrate has very little or no effect on the pressure drop for fluid flow through the membrane.

In the case of permanent supports which are wetted by the casting resin solution, the fibers of which the substrate is made should have a relatively high critical surface tension, such that the casting resin solution film will completely permeate the supporting web, and the resulting membrane precipitates in and around the fibrous material, and is permanently supported thereby, since the material of the support is embedded in the membrane. The resulting membrane has a somewhat higher pressure drop when tested with flowing fluid, but the increase compared with the unsupported membrane is small, if the supporting web has an open structure.

Suitable wetted substrates that can serve as permanent supports for the membrane include polyesters, as a nonwoven fibrous web or as a woven web, using monofilament or multifilament yarn, the monofilaments being preferable in terms of open structure and lower pressure drop; also polyimide fiber woven webs, woven and nonwoven webs of aromatic polyamides or Nomex, and other relatively polar fibrous products such as cellulose, regenerated cellulose, cellulose esters, cellulose ethers, glass fiber, and similar materials.

Cellulosic and synthetic fiber filter papers can be used, as well as perforated plastic sheets, and open mesh expanded plastics such as Delnet or similar extruded and thereafter expanded nettings. If the substrate is relatively coarse or in a very open weave structure, even if the fibers are not well wetted by the resin solution, the substrate may nonetheless be embedded or embraced by the membrane material in the final supported membrane product; such relatively poorly wetted materials as polypropylene and polyethylene can function as embedded substrates if they have a sufficiently open structure. If a polyolefin substrate has a relatively smaller pore size, for example, about 30 microns, the casting resin solution will not penetrate into it, but will instead form a membrane external to, but adhered to, the polyolefin substrate.

In a continuous process, the substrate can be in the form of an endless belt, which circulates through the entire film-forming operation, from casting of the casting resin solution film into and through a precipitating bath of the nonsolvent liquid, and then through the bath liquid removal step. A corrosion resistant metal drum, or endless metal belt can be used, but the surfaces on which the film is cast should be treated or coated so as to make them wettable.

The nucleated casting resin solution can be cast or spread out upon the substrate in the desired film thickness using a conventional doctor blade or roll, kissing or squeeze rolls or other conventional devices, and then contacted with the bath liquid with as little delay as possible.

The choice of nonsolvent liquid depends upon the solvent utilized. The preferred nonsolvent for producing nucleation in the polyamide resin solution is water or water-formic acid mixtures. However, any substance is suitable which is soluble in water and reduces the surface tension of water. Other nonsolvents include formamides and acetamides, dimethyl sulfoxide, and similar polar solvents, as well as polyols such as glycerol, glycols, polyglycols, and ethers and esters thereof, and mixtures of such compounds. Salts can also be added.

Following precipitation, the membrane film is washed to remove solvent. Water is suitable, but any volatile liquid in which the solvent is soluble and that can be removed during drying can be used as the washing liquid.

One or several washes or baths can be used as required to reduce solvent content to below the desired minimum. In the continuous process, wash liquid flow is countercurrently to the membrane, which can, for example, be passed through a series of shallow washing liquid baths in the washing stage.

The amount of washing required depends upon the residual solvent content desired in the membrane. If the solvent is an acid such as formic acid, residual formic acid can cause hydrolysis during storage of the polyamide of which the membrane is composed, with a consequent reduction in molecular weight; therefore, the washing should be continued until the formic acid level is low enough to prevent any significant hydrolysis during the anticipated storage period.

The drying of the washed membrane film requires a technique that takes into account the tendency of the membrane to shrink linearly when dried unsupported, with the result that the dried membrane film is warped. In order to obtain a flat uniform film, the membrane must be restrained from shrinkage during drying. One convenient way to do this, is to roll up a continuous web on a plastic or metal core, with a high degree of tension so as to obtain a tight roll, then firmly wrap this with a rigid but porous outer wrap, and then dry the assembly. Other methods of preventing shrinkage, such as tentering, or drying in drums under felt, are also satisfactory.

Individual membrane sheets of a selected size can be dried to produce flat sheets free of warpage by clamping the sheets in a frame restraining the sheet from shrinkage on all four sides, and then heating the framed membrane at elevated temperature until it has been dried. We have discovered that two or more equally sized membrane sheets can be placed in contact and dried together in a frame to prevent shrinkage. When this is done, the contacting layers adhere to each other, and can thereafter behave as though they were a single sheet. When the individual starting sheets are relatively thin, e.g. under 0.005 inch thick, and are of the unsupported (substrate free) type, they may be subsequently cut to size, for example, by steel rule dies, and are thereafter for practical purposes a single sheet or disc of filter medium.

The membranes can be dried in any of the ways described above, and then corrugated, seamed to provide a closed cylinder, and end capped. We have discovered that this process can be greatly simplified, while producing a superior product, by corrugating the filter medium while it is still wet, together with upstream and downstream layers of dry porous material, this material being chosed to be relatively rigid, and not subject to no more than a small shrinkage during the drying operation. The corrugated pack so formed is lightly compressed, so that the corrugations are in firm close contact, while being held in a holding jig, preferably one perforated to allow free access for heating and escape of vapor, and placed in an oven to dry. The resulting dried corrugated assembly shows only slight shrinkage, and the corrugated polyamide membrane so obtained is free of warpage, with well formed smooth corrugation crests, and flat faces between. When formed into a filtering element by side seaming and end capping, the porous support layers provide flow spaces for access of upstream (dirty) fluid and passage out of the element for downstream (clean) fluid.

If the filter cartridge is made using two or more thin layers of the polyamide membrane, these will be firmly adhered to each other at the conclusion of the drying operation, and behave mechanically as though they were a single layer.

The control of the precipitation so as to obtain the formation of a hydrophilic polyamide membrane sheet of desired flow characteristics and pore size requires that the casting resin solution be controlled with respect to a characteristic referred to herein as "nucleation". The variables that must be controlled include the choice of resin and of solvent and nonsolvent, the concentration of the resin in the starting polyamide resin solution, temperatures of all components, the quantity and mode of addition of nonsolvent, including rate of addition, intensity of mixing during addition, and the geometry of the apparatus, the latter including especially size and location of the nozzle through which the nonsolvent is added. For a given resin, solvent and nonsolvent, the effect of these variables on the degree of nucleation is qualitatively stated in Table III.

TABLE III

Variables affecting degree of nucleation

| Type of Variable | Variable | Direction of change to obtain a higher degree of nucleation |
|---|---|---|
| Mixing conditions | Temperature | Decrease |
| | Rate of nonsolvent addition | Increase |
| | Size of inlet opening through which the nonsolvent is fed | Increase |
| | Distance of the inlet opening from actual mixing area | Increase |
| | Intensity of mixing | Decrease |
| Concentration of the components in the casting solution | % of resin | Increase |
| | % of nonsolvent | Increase |
| Degree of nonsolvency of the nonsolvent | | Increase |

In Table III, the concentration of solvent is not included, as it is defined by the concentration of the resin and the nonsolvent.

It will be appreciated that the intensity of mixing in a given system is a function of a large number of variables. However, for a given system the relative intensity of mixing can be expressed in terms of the rotation rate of the agitator, or of the cutting blades of a homogenizer, etc. For a continuous production system (as opposed to a batch operation) an in-line mixer is required, and in a suitable designed multiblade mixer about ¼ to 2 hp is required to produce about 30 kg per hour of 2000 centipoise casting resin solution at a rotation rate between about 200 to 2000 rpm. Such equipment can take diverse forms, and can take any of a number of the designs commonly used in the mixing art, since the various mixing principles can all lead to similar results.

Because the intensity of mixing is difficult to quantify, transfer of manufacturing technology from batch systems to continuous systems requires trial-and-error experimentation, varying the operating condition parameters until one obtains the desired membrane sheet, all of which is within the capability of one skilled in this art, since it involves manipulation of variables that are customarily adjusted in chemical process industry manufacturing processes.

The importance of mixing intensity and of the other conditions related to mixing cannot be overemphasized. For example, a series of casting resin solutions with the same concentrations of the same resin, solvent, and nonsolvent, and the same temperature and viscosity can be produced by simply changing the mixer rpm. The most highly nucleated of these casting resin solutions, made using the slowest mixer speed, will then produce a membrane having an absolute pore rating of 0.1 $\mu$M; the next more highly agitated casting solution, cast into the same bath, will, if the mixing rate was correctly chosen, produce a 0.2 $\mu$M absolute membrane, and similarly by using successively higher mixing rates membranes can be made with absolute ratings of 0.4 $\mu$M, 0.6 $\mu$M, 0.8 $\mu$M, etc.

The nozzle diameter through which nonsolvent is delivered during preparation of the casting resin solution is also very important. It is at this nozzle that the precipitate forms, which at least in part subsequently redissolves, and the formation and complete or partial redissolution of the precipitate appears to play an essential role in the preparation of the casting resin solutions of this invention. With all other parameters maintained equal, a casting resin solution of quite different characteristics, in terms of the pore size of the resulting membrane, will be obtained by simply varying the diameter of the nozzle. We have used nozzle diameters varying from 0.013 inch to 0.125 inch diameter, but smaller or larger nozzles could be used with successful results.

Not only can a casting resin solution of given composition and temperature be made by varying the mixing intensity and thereby the degree of nucleation to produce greatly different membranes, but the converse is true, namely, membranes of equal or nearly equal characteristics can be made using a wide variety of resin, solvent, and nonsolvent concentration in the casting resin solution; for example, an increase in water content will increase the degree of nucleation, but if the mixing intensity is also increased, a casting resin solution will be obtained with the degree of nucleation unchanged, and the membrane cast from this casting resin solution will have characteristics equal to that made from the lower water content casting resin solution.

Figure 1:
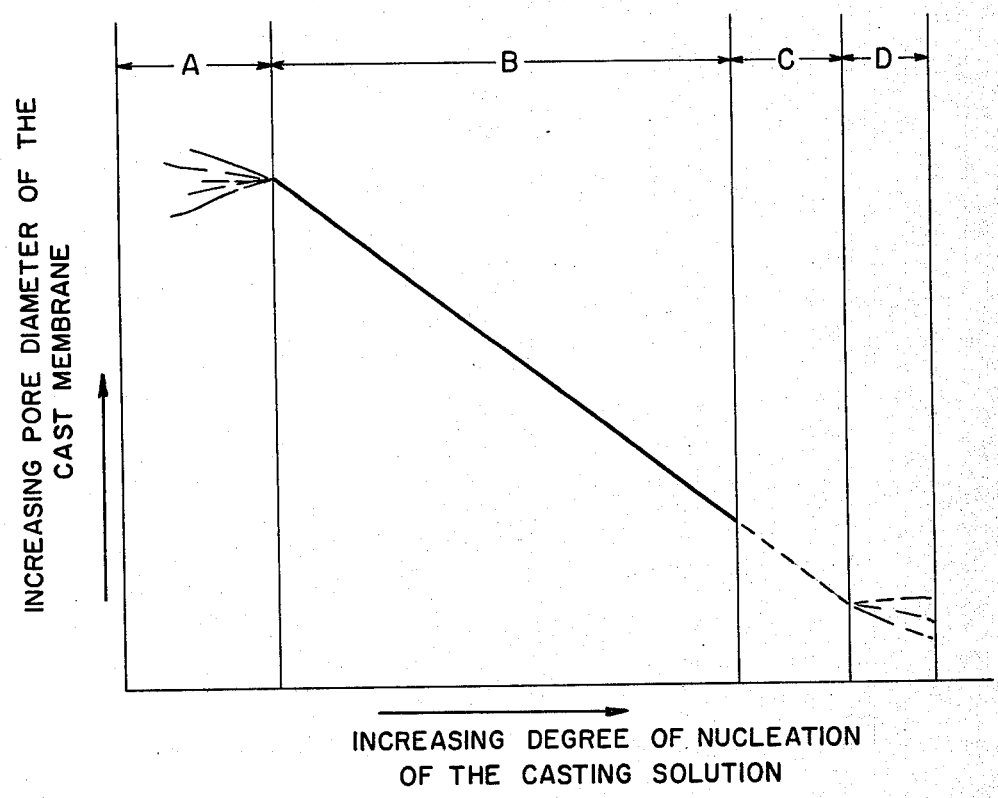
FIG. 1 is a graph showing in a qualitative manner the relationship between the degree of nucleation of the casting resin solution and the pore diameter of the resulting membrane.

The relationship between the degree of nucleation and the absolute particle removal rating of the resulting membrane is graphed in FIG. 1, which shows an inverse relationship between the pore diameter of the membrane sheet and the degree of nucleation, i.e., to obtain small pore diameter, a high degree of nucleation is required.

Reference to the graph of FIG. 1 shows that in Region A, where the degree of nucleation is very small, the pore size tends to become nonreproducible. In addition, the pressure drop at a given pore diameter is high. Membranes made on the assumption that the concentrations of the components are the controlling factors, and without nucleation, for example, by the process of Marinaccio, fall into this range, and tend to be of relatively poor quality. In Region B, the pore size decreases in a regular, though not necessarily linear fashion, as the degree of nucleation increases. In Region C, the casting resin solution becomes increasingly populated by particles of resin which have not redissolved, but still produces good quality membrane if these are removed by filtration prior to casting; and in Region D, the resin solution from which these lumps have been removed by filtration becomes unstable, and prone to early local or overall gelation before the film can be cast. The very high degree of nucleation in Region D is sometimes manifested by an opalescent appearance, suggesting that the nucleation procedure has resulted in an excessive number and/or excessively large nuclei.

Because methods of achieving a required intensity of mixing vary so greatly among the various types of equipment used in the mixing art, it is not possible to quantify this characteristic. Consequently, any given apparatus must initially be used on a "cut and try" basis to produce casting solutions of the desired characteristics, applying the principles tabulated in Table III. Once the parameters of mixer rate, concentrations, temperatures, flow rates, etc. have been established, casting resin solutions having quite reproducible characteristics can be produced in the B and C Region of FIG. 1, on successive days or weeks of operation.

A favorable condition for producing membranes having low pressure drops and particle removal ratings covering a wide range utilizes a starting resin containing 15.5% of 42,000 molecular weight Nylon 66 resin, 83.23% of formic acid, and 1.27% of water. When this starting resin solution is diluted using the conditions of Examples 1 to 39, the results obtained in FIG. 10 are obtained. The product range of $K_{L5}$ is such that membranes are obtained with absolute particle ratings ranging from about 0.1 micron (for example, a 0.012 inch thick membrane with $K_{L5}=100$ psi) to about 1 micron (for example, a 0.001 inch thick membrane with $K_{L5}=27$ psi).

The curves of FIG. 10 were obtained using a specific in-line mixer configuration, in which the rotor was 2½ inch in diameter. The same results can be obtained by using other mixers, and the RPM needed to produce these results may vary; however, it is within the ability of a person familiar with the art to determine by test the conditions required with his apparatus to duplicate the intensity of mixing represented, for example, by the 1950 RPM and 400 RPM conditions of FIG. 10, and once this has been accomplished, the conditions for making membranes covering the whole range of FIG. 10 will be apparent to him.

This same correlation of mixing conditions would then be equally applicable to the other Examples of this invention, in which an in-line mixer was used.

The casting resin solution can be extruded above or under the surface of the nonsolvent bath, especially if used to make hollow fibers; this process is more easily realized in practice by using relatively high resin viscosities (e.g., 100,000 cp) and rapidly setting casting resin solution in relatively lower formic acid concentration baths, e.g. in the 20 to 40% range.

As previously described, three types of substrates are used:

(a) nonporous, for example, commercial polypropylene or other plastic film, glass, etc.;

(b) porous, not wetted by the casting resin solution; and (c) porous, wetted by the casting resin solution.

The nonsolvent precipitation baths used in this invention contain a mixture of solvent and nonsolvent for the resin. The characteristic of the bath which has an important effect on the properties of the resulting membrane is the relative concentration of solvent and nonsolvent in the bath. If the concentration of solvent is zero, or at low level, for example, below 20%, a heavily skinned membrane will be obtained. If the concentration is adjusted to one of the preferred ranges of this invention (about 43 to 55% of formic acid, in the case of a bath containing only water and formic acid) the resulting membrane has uniform pores from one face to the other.

If the bath concentration is 43 to 55%, and the substrates used are of types (b) or (c) described above, the pores will always be uniform through the thickness of the polyamide membrane. However, if the film is cast on a nonporous substrate of type (a), it is important that the substrate surface be wettable by the casting resin, and by the bath fluid. Glass, and similar surfaces, are naturally so wetted; however, synthetic plastic film materials, such as polyethylene, polypropylene, polyvinyl chloride, and polyester are not, and if the casting solution is spread on such a substrate, and immersed into a 45% formic acid 55% water bath, it will form a film with open pores on the face in contact with the bath, the pores being uniform throughout most of the body of the film, but with a dense skin on the substrate side. We have, however, discovered that if such plastic films are rendered more wettable, for example, by surface oxidative processes such as chromic acid treatment or corona discharge treatment, the resulting membrane is skinless on both faces, and of uniform pore size throughout. In such a membrane, it is difficult if not impossible to determine by any manner of appraisal which side was in contact with the substrate.

To obtain such skinless membrane sheets, a wide range of surfaces can serve as the substrate, provided that the critical surface tension is maintained at a sufficiently high value. This will vary somewhat depending on the concentration of formic acid in the resin solution and in the bath, and the temperature, and is best determined by trial-and-error treatment of the substrate surface for a given system. Critical surface tensions required are generally in the range from about 45 to about 60 dynes/cm, and most often in the range of from 50 to 56 dynes/cm.

If a given casting resin solution is immersed as a film into a series of baths, each with slightly increasing water content, the characteristics of the membrane on the side facing the bath will gradually change, producing film which have finer pores at and near this face, compared with the balance of the thickness of the membrane. These finer pores show a gradual transition into the uniform pores of the balance of the membrane. Such membranes are described herein as "tapered pore membranes", and are useful in that, when filtering some suspensions, with flow from the coarser to the finer side, longer service life (higher dirt capacity) is obtained, with equal removal. FIG. 7 shows scanning electron micrographs of a tapered pore membrane. The bath solvent concentration required to obtain any desired taper pore membrane varies considerably, depending, for example, on the state of nucleation of the casting resin solution, and should be determined for a given set of conditions by trial-and-error; however, in the case of a water-formic acid bath, it is never less than 15 to 25%, and usually is near to 30 to 35% of formic acid.

As the bath water concentration increases, the membranes begin to form with increasingly heavier skins, and are characterized by high pressure drop, and poor pore size distribution characteristics.

Figure 3:
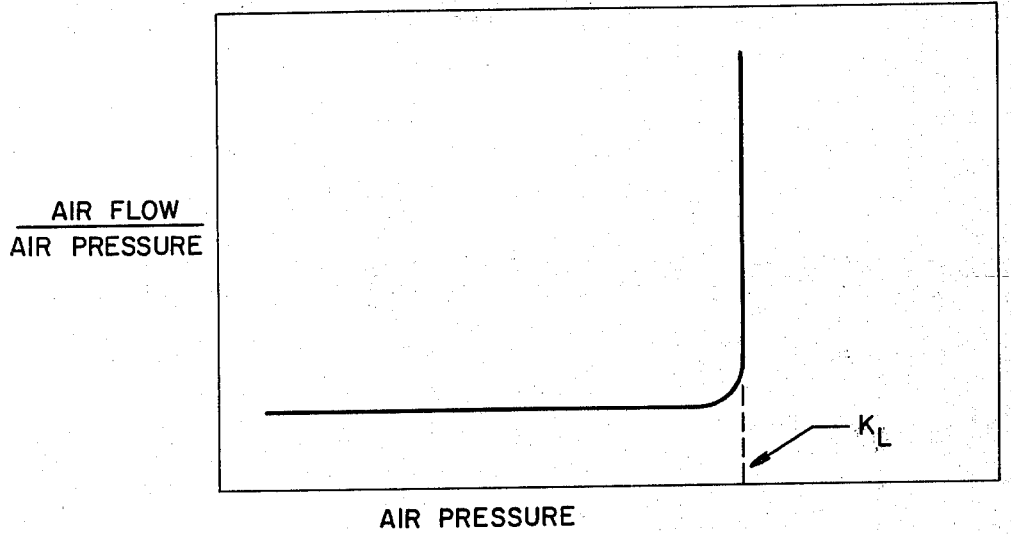
FIG. 3 is a graph showing the relationship obtained when a wetted membrane is pressurized by a gas, and the ratio $$\frac{\text{air flow}}{\text{air pressure}}$$

The uniform pore membranes made by the process of this invention, such as those shown in the scanning electron micrographs of FIGS. 5 and 6, are characterized by liquid displacement curves such as shown in FIG. 3. When the membrane is immersed into water, its pores are filled by the water forming within the membrane a film of immobilized water, which remains in place when the membrane is removed from immersion. When air pressure is then applied across the membrane, there is noted a very small flow of air. This air flow when divided by the applied air pressure remains constant as the pressure is increased, when plotted as in FIG. 3. From the thickness of the film, and the known diffusion constant of air in water, it can be calculated using Fick's law, that this flow is due to diffusion of air through the water film, and does not indicate flow through pores of the filter medium. At a sufficiently high pressure, the flow as plotted in FIG. 3 is seen to increase suddenly, reflecting displacement of water from the largest pores, and flow of air through these pores, and the curve becomes nearly vertical. The sharpness of this rise will be appreciated by noting that in this region, the membranes of this invention require less than a 1% to 3% increase in pressure drop to accomplish a 5000 fold increase in air flow rate.

The rapid transition from zero flow of air (except that due to diffusion) to a very steeply rising rate of flow for small changes in applied pressure, characterizes uniform pore media, which have sharply defined removal characteristics; such media will, for example, quantitatively remove one bacterium, but will allow an only slightly smaller organism to pass. Such membranes generally also have favorably low pressure drop, for a given removal.

Skinned membranes behave very differently; when water wetted and their air flow-pressure drop relationship is determined, the curve is not flat initially, but slopes upward, indicating presence of large pores; transition to a more nearly vertical line is slow, with a large radius, and in the "vertical" area, instead of the sharp rise of FIG. 3, a sloping line is obtained, reflecting a wide pore size range. Such membranes are poorly suited to obtain sterile filtrates when challenged by bacteria; either a nonsterile fluid is obtained, or if sterility is gotten, it is at the cost of very high pressure drop to achieve a low throughput rate.

It is apparent from the preceding discussion that control within narrow limits of the concentration of formic acid in the nonsolvent liquid in the bath is desirable to obtain a uniform product. In a continuous process, this control is obtained by an appropriate feed to the bath of nonsolvent liquid, while simultaneously withdrawing some of the bath liquid to maintain constant total bath volume. A relatively higher concentration of formic acid enters the bath from the casting resin solution, and the concentration of formic acid in the bath therefore tends to increase. Water is therefore constantly added to the bath to compensate. Accordingly, control of the rate of addition of water and of the rate of withdrawal of surplus bath solution will give the desired result: substantially constant concentration of formic acid in the solution, within the limits that give a membrane of the characteristics desired.

Thus, Example 47 shows that in order to obtain a skinless membrane sheet having a uniform pore distribution, with fine enough pores to quantitatively remove all incident bacteria and particles over 0.2 $\mu M$, a relatively highly nucleated casting resin solution is cast as a film and the membrane precipitated in a 46.4% aqueous formic acid solution as the bath liquid.

To produce a membrane with tapered fine pores, a film of less highly nucleated casting resin solution is precipitated in membrane form by an aqueous 25% formic acid solution as the bath, as in Example 60.

It is instructive to note that in the range of 0.2 μM and below, the uniformity from face to face of commercially available regenerated cellulose and cellulose ester membranes becomes quite poor, and such membranes are to some degree tapered pore types. In the same range, the membranes of the invention remain uniform, or may be tapered, as desired.

Thus, in the continuous production of membrane sheets in accordance with the invention, to obtain uniform characteristics in the membrane, the casting resin solution must be prepared under carefully controlled conditions and the bath liquid composition must remain constant. Such a liquid is referred to as an "equilibrium bath", i.e., a bath in which the concentration of ingredients remains constant, regardless of additions and withdrawals.

To illustrate, consider a casting resin solution containing 13% resin and 69% formic acid with the balance water, continuously being cast in film form on a substrate, and then plunged into an aqueous nonsolvent bath containing 46% formic acid. As the resin membrane precipitates, a proportion of the solvent from the film of casting resin solution (which contains 69 parts of formic acid to 18 parts of water, or 79.3% formic acid) diffuses into the bath, thereby altering its composition. To counteract this, water is continuously added to the bath at a rate controlled, for example, by a device using density measurements to report formic acid concentration, at the 46% level, and bath liquid is withdrawn continuously to maintain total bath volume constant. Maintaining this equilibrium bath makes it possible to continuously produce a membrane sheet having uniform pore characteristics.

When used continuously, at high production rates, the bath temperature will gradually increase; cooling by a heat exchanger may be used to maintain constant conditions.

From the above-mentioned casting resin solution and bath, unsupported membrane sheets can be made by casting the resin solution onto an endless belt, or onto a plastic sheet unreeled from a roll, as a substrate to support the cast film.

The membrane sheet has a tendency to adhere to the substrate surface on drying, and it is therefore important to remove the membrane sheet from the surface while it is still wet, and before it has been dried and developed adherency.

Unsupported membrane sheets obtained by the process of the invention are quite strong, with water-wet tensile strengths in the rage of 400 to 600 lbs./sq. inch, and elongations generally exceeding 40%.

For some applications, even higher tensile strengths may be desired. In addition, unsupported membrane sheet requires special care to manipulate in the typical range of thicknesses from 0.002 to 0.010 inch in which it is normally manufactured. In such cases, a supported membrane sheet is desired. Such membrane sheet is prepared by forming the film of resin solution on a substrate which adheres to the membrane sheet after it has been precipitated thereon. Either of the two types of substrates can be used; those which are not wetted by the resin solution, and those which are.

The unsupported filter membrane obtained at the conclusion of the membrane-forming process is wet with water, also contains a small amount of residual formic acid. This product can be dried in various ways.

It can, for example, be collected on a roll on a suitable core in lengths from 50 to 100 linear feet and placed in an oven until dry. During drying, some shrinkage occurs, but an acceptable product is obtained.

It is also possible to clamp a length of membrane in a frame holding all sides against shrinkage, and then dry the membrane by exposure to heat, as by infrared radiation, or in an oven in air. The resulting sheet is very flat, and when discs are cut from it, these are adapted for use in apparatus designed to accept disc filter membranes. The membrane discs are quite strong and flexible, and can be readily and reliably assembled in such apparatus.

A similar product can be obtained with less hand labor by passing the wetted membrane sheet over a hot drum, against which it is firmly held by a tensioned felt web or other porous sheet, and the dry web collected as a roll.

If two or more layers of wet unsupported membrane sheet are dried in contact with each other, using any of the drying methods described above, they adhere to each other, forming a multi-layer structure. No bonding agent or other adhesion technique is required.

The resulting multi-layer membranes are useful in the manner of a single layer filter membrane. Since in manufacture a small proportion of undetected faults may occur, caused, for example, by bubbles of air entrained in the casting resin solution, using two layers instead of one neutralizes such areas, covering them over with a second layer of filter membrane that is also capable of providing the required removal rating; an extremely high degree of reliability is obtained in this manner.

Very good adhesion of adjacent layers is also obtained if a layer of supported resin membrane and one not supported are dried in contact, using the same procedures. In this manner, filter media can be made in which a supported layer of uniform pore size is bonded to an unsupported tapered pore membrane layer, which provides efficient prefiltration. The fine face of the tapered pore layer would be about the same pore size or somewhat larger than the pore size of the supported layer, and this face would be adjacent to the unsupported layer.

Supported filter membranes in accordance with the invention are particularly well suited to use on filter presses, where self-sealing characteristics are needed, and the filters are subjected to large stresses. They are also useful in making plain, or corrugated filter cartridges for use at high differential pressures, or for impulse type service.

The filter membranes of the invention are well suited for use as the filter media in filter cartridges. Filter cartridges are self-contained filter elements, provided with a filter sheet in tubular form capped off by end caps at each end. Either or both end caps can have a through opening for fluid circulation through the filter sheet in either direction. Filter cartridges are designed to be installed in and to be readily removable from filter assembly housings when replacement is necessary.

A good filter cartridge has a filter sheet that is free of faults, and with removal characteristics that are relatively uniform with stated standards. Filter cartridges take many forms, including simple cylinders, corrugated cylinders, stacked discs, etc.

Of these configurations, a favored form for the filter membranes of the invention is a corrugated cylinder. Such a cylinder is made by corrugating one or more layers of supported or unsupported wet membrane (two layers is preferred) sandwiched between two open porous or foraminous sheets which provide for fluid flow up and downstream of the contacting surfaces of the filter medium within the corrugations. The resulting corrugated structure can be dried while lightly restrained, in the course of which contacting membrane layers are bonded together, thus forming a more rigid, stronger structure, and then seamed closed along the contacting ends, using heat-sealing techniques similar to those used for sealing conventional thermoplastic filter materials. End caps are then attached in a leak-tight manner to each end of the resulting cylinder. The preferred method is in accordance with U.S. Pat. No. 3,457,339, patented Dec. 8, 1965, to Pall et al. The end cap material can be any of a wide range of thermoplastic synthetic resin materials, particularly polypropylene, polyamides, polyesters and polyethylene. Polyester end caps, particularly polyethylene terephthalate and polybutylene terephthalate, seal very well to polyamide membrane materials, and have the advantage that the assembled cartridge is rapidly wetted by water, permitting a test using the standardized procedures of the invention to verify the integrity of the assembled filter cartridge.

In the manufacture of corrugated cylindrical filter cartridges, a seam must be made joining the ends of the corrugated structures. Since the polyamides used to make the membranes of this invention are thermoplastic, heat sealing may be used to close the seam, and is for many or most purposes an acceptable method. Heat sealing does have some disadvantages, however:

(a) in order to make the seal, it is, practically, necessary to bend the last leaf of each outermost corrugation to an angle of 90°, which is sometimes difficult to accomplish without weakening or other injury to the filter medium at bend;

(b) the temperature used and duration of the sealing operation need to be changed to accommodate changes in thickness of the filter medium layers used; and (c) a weakening of the structure occurs due to the introduction of a stress concentration at the edge of the seal area; if highly stressed, the filter will fail at this edge, in preference to any other part of the assembly.

All these disadvantages are overcome by a novel joining technique. We have discovered that a solution of trifluoroethanol containing 3 to 7% of Nylon 66 in solution can be applied to the outermost face of each end corrugation, and the two surfaces then lightly clamped together, and the fluoroethanol allowed to evaporate. Other solutions may be used, for example, a 33% solution of Nylon 66 in formic acid, similarly solutions of polyamide resins in hexafluoroisopropanol or hexafluoroacetone sesquihydrate. An excellent seal results, free of all the disadvantages enumerated above; indeed the seal area is now stronger than the remaining corrugations.

The quantity and concentration of the resin solution are quite noncritical, and good seals have been made with as little as zero percent or as much as 9% of Nylon 66 resin in the trifluoroethanol solution, but in this solvent solutions in the neighborhood of 5% are preferred, being stable, and having a convenient viscosity if a high molecular weight resin is used to prepare the solution. Solutions is formic acid have also been successfully used.

The accurate determination of effective pore size for membrane filter media that is meaningful in its representation of expected effectiveness as a filter is difficult. When a uniform pore filter medium of this invention, or any of the currently marketed uniform pore membranes are examined using a scanning electron microscope, e.g. as is shown in FIG. 5, and the apparent pore openings as seen on the micrograph are measured, a pore size is determined which is about three to five times the diameter of the largest particle which the filter will pass, as determined, for example, by bacteria challenge. Similarly, it has been attempted to ascertain the pore diameter from the $K_L$ value as determined by the procedure of applying air pressure to a wetted element, obtaining the $K_L$ value in the manner shown in FIG. 3, and inserting the so determined pressure into the well known capillary rise equation; when this is done a diameter is determined which is about four times the absolute removal rating of the filter medium as determined by bacterial challenge.

Such methods, upon reflection, appear to have little relevance to the capability of the membrane as a filter. What the user needs to know is not pore size; rather, it is the capability of the filter in removing particulates, bacteria, yeast, or other contaminants.

Contrary to established thinking, we have determined by test that the effectiveness of membranes of structure similar to those of this invention as filter media is dependent not only on pore size, but also on thickness. In the development of the present invention, it has, for example, been demonstrated that of two membranes, one having small pores and quite thin, and the other having relatively larger pores and much thicker, the membrane have the larger pores but the greater thickness may be more effective as a filter.

Accordingly, the effectiveness of the membrane sheets in accordance with the invention as filter media is rated not in terms of pore size, but in terms of effectiveness in the removal of a contaminant of known dimensions. One of the principal applications of this type of filter membrane is to deliver a filtrate freed of all incident bacteria, hence bacterially sterile. A technique usually used in the industry to determine the ability of a filter to deliver bacterially sterile effluent is to challenge it with a suspension of *Pseudomonas diminutiae, which is a small diameter relatively nonpathogenic bacterium referred to in abbreviated form by Ps. Filters which successfully meet such a challenge are generally accepted in the industry as being* 0.22 micrometer absolute in filter rating, and in any event *Pseudomonas diminutiae* is a bacterium that represents the lower limit of bacterial dimensions. If no combination of challenge conditions can be found which will allow even a single organism of *Pseudomonas diminutiae* to pass, the filter can be regarded as capable of quantitatively removing all bacteria.

This invention employs a standardized test based on *Pseudomonas diminutiae* removal that correlates such removal with air flow measurements through the wetted membrane and the thickness of the membrane, and is capable of providing a quite complete characterization of the removal characteristics of the membrane filter sheet being tested.

The removal of *Pseudomonas diminutiae* is a function not only of pore size but also of thickness, and is expressed by the exponential relationship:

$$T_R = T_{R1}{}^t,$$

or log $T_R = t \log T_{R1}$ where
- $T_R$ is the titer reduction for the membrane and is the ratio of *Pseudomonas diminutiae* content in the influent to the content thereof in the effluent;
- $T_{R1}$ the titer reduction achieved by a membrane of unit thickness; and
- t is the thickness of the membrane.

As an example of the application of this formula, if a given membrane has a titer reduction of $10^5$, two layers of the membrane will have a titer reduction of $10^{10}$, three layers of $10^{15}$, etc.

Figure 2:
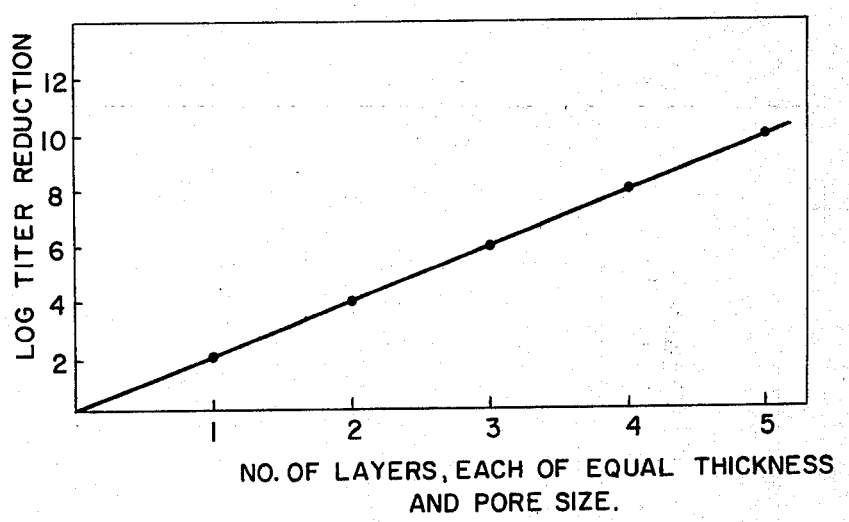
FIG. 2 is a graph showing the relationship for a uniform pore membrane between titer reduction, defined as the ratio of *Pseudomonas diminutiae* bacteria contained in the influent liquid to that obtained in the effluent liquid, and the number of layers of uniform pore filter medium through which the bacteria laden liquid is passed.

Since the incident test bacterium is monodisperse (i.e., of uniform dimensions), the applicability of this formula is self-evident. Its correctness has also been confirmed experimentally, by determining titer reductions for 1, 2, 3, 4 and 5 layers of the same membranes. As shown in FIG. 2 the resulting plot of log $T_R$ vs. number of layers is linear, as predicted by the formula.

It is known in the industry to measure air flow rates through a membrane which has been wetted by a liquid; such measurements yield useful information on the pore size characteristics of the membrane. We have used, in the course of this invention, a parameter designed as $K_L$. $K_L$ is a form of abbreviation for the "knee location" of the curve of FIG. 3. When the air flow/unit of applied pressure through a wetted membrane is plotted against increasing applied pressure, as in FIG. 3, the initial air flow is very small and the flow per unit of applied pressure remains nearly constant, until a point is reached where a very small increment in pressure causes a very sharp rise in flow, such that the curve becomes nearly vertical. The pressure at which this occurs is designated as the $K_L$ for the membrane.

$K_L$ has been measured for a group of forty-five membranes made by the process of this invention from polyhexamethylene adipamide; these membranes were selected to cover a range of thickness from 0.0015 inch to 0.012 inch, and with a wide range of pore diameters. These same membranes were then challenged with a suspension of Ps bacteria, and the number of influent bacteria was then divided by the number of effluent bacteria, thus determining the $T_R$ for each of the membranes. thickness of each membrane was then measured, in mils (one mil=0.001 inch), and using the formula $$\log T_{R1} = \frac{1}{t} \log T_R$$

log $T_{R1}$ was then calculated for each membrane, $T_{R1}$ being the theoretical titer reduction for a 1 mil membrane.

$K_L$ values were measured, for both relatively coarse and relatively fine membranes, for a number of thin membranes. These same membranes were then laid up as 2, 3 and more layers, and the $K_L$ values again measured for the multilayers. In this way, a relationship between the thickness and $K_L$ value of equal pore size membranes was determined; this relationship is summarized in Table I. Using Table I, the $K_L$ values of the 45 membranes were corrected to the $K_L$ which would apply to an equal pore size membrane 0.005 inch (5 mils) thick; these values are designated as $K_{L5}$.

Log $T_{R1}$ for each membrane was then plotted against $K_{L5}$ for that membrane. All the results fell close to a single line, which is shown in FIG. 4.

Using FIG. 4, the titer reduction ($T_R$) which can be expected to be obtained with any membrane made of hexamethylamine adipamide by the process of this invention, can be calculated, using the measured $K_L$ and thickness (t) for that specimen. The procedure is as follows:
(1) measure the $K_L$ and thickness for the specimen;
(2) use Table I, determine $K_{L5}$;
(3) use $K_{L5}$ to determine $T_{R1}$ from FIG. 4; and
(4) calculate $T_R$ from the equation $T_R = T_{R1}^t$.

There is an upper limit to the number of bacteria which can be collected on a membrane; by the time that about $10^{13}$ Ps. have been collected per square foot of filter medium, flow through the filter has fallen to less than 0.01% of a normal starting flow rate of 2 to 5 liters/minute per square foot. This has been determined, by actual test, to be true for the membranes of this invention, as well as for commercially available membranes, for the full range of $T_R$ from 10 to $>10^{30}$. Thus, the figure of $10^{13}$/square foot may be taken as a practical upper limit of invading *Pseudomonas diminutiae*.

This upper limit is taken in combination with the calculated $T_R$ to obtain assurance that a given membrane will yield sterility under all conditions of use. For example, a membrane may be selected with an estimated $T_R$ of $10^{23}$; statistically, if challenged with $10^{13}$ *Pseudomonas diminutiae*, such a membrane would have to be so challenged for $10^{10}$ (or 10 billion) times, in order to produce a single effluent with one bacterium, and such a high ratio may be taken as adequate assurance of sterility, hence the filter can be considered to have an absolute removal capability at 0.2 $\mu M$. In practice, it is difficult to consistently produce a membrane with an estimated $T_R$ of exactly $10^{23}$, but it is feasible to establish a permissible range, say $10^{23}$ to $10^{27}$, with $10^{23}$ as the lower limit, and thus obtain assurance of consistency bacterially sterile filtrates.

In a similar fashion, $K_L$ and thickness can be correlated with titer reduction for larger bacteria, yeasts of known size, and other particulate material, the latter assayed by particle detection methods, over a size range from under 0.1 $\mu M$ or larger.

The curve of FIG. 4 is applicable to the membranes made by the process of this invention. The process by which this curve was developed can be applied to membranes made by other processes. The location of the curve for other membranes may shift somewhat, but we have done sufficient testing using currently marketed uniform pore dry process membranes to determine that the same principles are applicable.

The horizontal portion of the curve of FIG. 3 is truly horizontal only if the pore size is quite uniform. Uniform pore media are further characterized by a sharp change in slope to a nearly vertical course at the $K_L$ value. If the filter medium is relatively nonuniform in pore size, it will tend to have a distinct slope in the horizontal portion of the curve, and exhibits a relatively large radius for the change in slope to the more vertical portion of the curve, followed by a sloping rather than a nearly vertical portion.

The lower or horizontal portion of the curve is a measure of the diffusion of air through the immobilized, liquid film which fills the pores of the membrane. The wetting liquid may be water, in which case a relatively low air flow is obtained in the horizontal part of the curve, or alcohol, in which case the diffusional air flow is higher. At the change in slope, the wetting liquid begins to be expelled from the pores, and in the vertical portion of the curve, a large number of nearly equal size pores begin to pass air.

When the data of FIG. 3 is plotted for a tapered pore membrane, that is, one with larger pores at one face, tapering to a smaller pore at the other face of the membrane, the curves obtained by reversing the direction of pressurization do not coincide. Instead, two distinct curves are obtained, one flat, and the other higher and sloping upward, of which the sloping curve with higher flow values is obtained when the more open side is upstream, and reflects the penetration of air partly into the coarser face of the membrane, thereby effectively decreasing the thickness of the liquid film, and hence increasing the air diffusion rate.

Thus, by applying air pressure and measuring flow through a membrane successively in both directions, it is possible to determine whether it is a uniform or tapered pore membrane. If the flow-pressure curves are equal, or nearly so, in both directions, the pores are uniform, and the method described herein for relating $K_L$ and thickness to titer reduction for any given organism, or to a monodisperse particulate, may be applied to that membrane.

The following Examples in the opinion of the inventor represent preferred embodiments of the invention:

EXAMPLES 1 to 5

Nylon 66 resin pellets of molecular weight approximately 42,000 were dissolved in 98.5% formic acid, to yield a 35° C. solution containing 15.5% of the resin. Without delay, this solution was delivered at a flow rate of 250 g/minute to an in-line mixer. Simultaneously, a controlled water flow at 31° C. was delivered to the mixer, the quantity being such as to produce as the effluent a casting resin solution containing 70.2% of formic acid and 13.1% of the resin. The casting resin solution was filtered through a 10 μM filter to remove visible resin particles, and was then formed as a thin film by a doctoring roll with 0.0085 inch spacing on a moving polyester sheet surface, which had been pretreated by corona discharge to improve its wettability; and in less than 3 seconds immersed into a bath containing 46.5% formic acid, balance water, for approximately 3 minutes. Bath concentration was maintained constant by adding water continuously, in the amount required. The nylon membrane so formed was washed with flowing water for 1 hour. Two layers of the membrane were removed from the polyester substrate sheet and oven dried in contact with each other, while restrained to prevent shrinkage of the length and width during drying.

The rotation rate of the in-line mixer was varied from 400 to 1600 RPM during this run. Table IV shows the product characteristics obtained. In this Table, "uniform pores" means that the pore size was equal, as determined by SEM examination throughout the whole width of the membrane. Examples 1 and 2 represent conditions in region A of FIG. 1, in which the degree of nucleation is too low to produce a satisfactory product; in this zone pressure drops are high, and product characteristics tend to be nonreproducible. Example 5, in which mixer speed was 400 RPM falls into region D of FIG. 1, and resulted in an unstable condition, with so much precipitating resin generated within the mixer, that it began to clog, such that casting resin solution could not be delivered.

The wide variation in behavior and in product characteristics, for the same casting resin solution as defined by the concentration of its components, should be noted.

EXAMPLES 6, 7 and 8

Casting resin solution was prepared and processed as for Example 4, except that it was heated by means of an in-line heat exchanger to respectively 53°, 61° and 68° C. prior to casting. The product characteristics were not significantly different from those of Example 4. This result confirmed previous test data indicating that temperature of the casting resin solution is not a significant parameter, except insofar as viscosity may be reduced to the point (below about 500 cp) where casting problems may be experienced.

EXAMPLES 9 to 13

The membranes were prepared in the same way as Examples 1 to 5, except that the quantity of water added was such as to produce a casting resin containing 69.8% of formic acid and 13.0% of resin. The results are shown in Table V. The casting resin solution made at 1950 RPM mixer speed was insufficiently nucleated, resulting in a poor product with high pressure drop.

EXAMPLES 14 to 18

These membranes were prepared in the same way as Examples 1 to 5, except that the quantity of water added was such as to produce a casting resin solution containing 69.0% of formic acid and 12.85% of resin. The results are shown in Table VI.

EXAMPLES 19 to 39

These membranes were prepared in the same way as Examples 1 to 5, except that the quantities of water added were such as to produce casting resin solutions containing 71.4%, 67.5% and 66.0% of formic acid, and 13.3%, 12.55% and 12.41% respectively of resin.

The results are shown in graphical form, along with the data of Examples 1 to 19, in FIG. 10. FIG. 10 includes only those membranes which fall in the regions B and C of FIG. 1, and therefore have favorably low pressure drop in proportion to their thickness and particle removal capability, and are consistently reproducible.

TABLE IV

| Example No. | Mixer RPM | Casting resin temp °C. | $K_{L5}$ PSI | $\Delta p^1$ | t mils | Estimated $T_R$ (Ps.) | Absolute particle rating, μM | Remarks |
|---|---|---|---|---|---|---|---|---|
| 1 | 1600 | 68 | 42.7 | 22.7 | 5.5 | NA | NA | Insufficient nucleation |
| 2 | 1200 | 61 | 34 | 12.6 | 4.8 | NA | NA | Insufficient nucleation |
| 3 | 800 | 53 | 31.4 | 4.0 | 5.8 | $1.4 \times 10^6$ | 0.47 | Uniform pores |
| 4 | 600 | 51 | 39.3 | 5.6 | 6.5 | $1.1 \times 10^{17}$ | 0.20 | Uniform pores |
| 5 | 400 | 46 | — | — | — | — | — | Unstable casting resin |

[1]Pressure drop in inches of mercury column at air flow rate of 28 feet/minute.

TABLE V

| Example No. | Mixer RPM | Casting Resin temp °C. | $K_{L5}$ PSI | $\Delta p.^1$ | t mils | Estimated $T_R$ (Ps.) | Absolute particle rating, $\mu M$ | Remarks |
|---|---|---|---|---|---|---|---|---|
| 9 | 1950 | 70 | 30.3 | 11.1 | 5.4 | NA | NA | Insufficient nucleation |
| 10 | 1600 | 66 | 30.4 | 4.4 | 5.1 | $1.6 \times 10^5$ | 0.5 | Uniform pores |
| 11 | 1200 | 58 | 41.6 | 5.2 | 5.6 | $6 \times 10^{13}$ | 0.22 | Uniform pores |
| 12 | 600 | 48 | 54.4 | 8.2 | 5.1 | $>10^{30}$ | 0.17 | Uniform pores |
| 13 | 400 | 45 | 63.6 | 10.7 | 4.9 | $>10^{30}$ | 0.15 | Uniform pores |

[1] Pressure drop in inches of mercury column at air flow rate of 28 feet/minute

TABLE VI

| Example No. | Mixer RPM | Casting Resin temp °C. | $K_{L5}$ PSI | $\Delta p.^1$ | t mils | Estimated $T_R$ (Ps.) | Absolute particle rating, $\mu M$ | Remarks |
|---|---|---|---|---|---|---|---|---|
| 14 | 1950 | 71 | 27 | 5.7 | 6.1 | $1.4 \times 10^4$ | 0.88 | Insufficient nucleation |
| 15 | 1600 | 65 | 32.1 | 4.6 | 6.4 | $2.4 \times 10^7$ | 0.45 | Uniform pores |
| 16 | 1200 | 57 | 44 | 7.1 | 6.0 | $1.6 \times 10^{28}$ | 0.20 | Uniform pores |
| 17 | 800 | 51 | 100 | 17.5 | 4.8 | $>10^{30}$ | 0.10 | Uniform pores |
| 18 | 600 | 49 | 76.3 | 13.8 | 4.4 | $>10^{30}$ | 0.13 | Casting resin in near to unstable region |

[1] Pressure drop in inches of mercury column at air flow rate of 28 feet/minute

EXAMPLES 40 to 46

These membranes were prepared in the same way as Examples 1 to 5, except (A) Starting resin containing 14.5% of Nylon 66 was delivered to the mixer at 400 g/minute.
(B) Water was added in various quantities, to obtain formic acid and resin concentrations as listed.
(C) Doctor roll set at 0.022 inch.

The results are listed in Table VII.

TABLE VII

| Example No. | Mixer RPM | Temp. °C. | Casting Resin % Formic Acid | Casting Resin % Resin | $K_{L5}$ PSI | $\Delta p^1$ | t mils | Estimated $T_R$ (Ps.) | Absolute particle rating, $\mu M$ |
|---|---|---|---|---|---|---|---|---|---|
| 40 | 1900 | 52 | 65.4 | 11.4 | 108 | 22 | 7.3 | $>10^{30}$ | 0.09 |
| 41 | 1900 | 54 | 67.8 | 11.8 | 43.9 | 12.1 | 11.6 | $>10^{30}$ | 0.18 |
| 42 | 1900 | 56 | 69.7 | 12.0 | 29.0 | 7.7 | 14.5 | $7 \times 10^7$ | 0.45 |
| 43 | 1900 | 58 | 71.5 | 12.3 | 21.3 | 4.7 | 13.9 | $7 \times 10^4$ | 0.85 |
| 44 | 1900 | 59 | 72.4 | 12.5 | 17.2 | 4.2 | 12.8 | $6 \times 10^2$ | 1.0 |
| 45 | 600 | 47 | 74.2 | 12.8 | 13.2 | 4.0 | 13.0 | 50 | 2.0 |
| 46 | 600 | 47 | 74.2 | 12.8 | 10.1 | 1.0 | 2.1 | 2 | 5.0 |

[1] Pressure drop in inches of mercury column at air flow rate of 28 feet/minute

EXAMPLES 47 to 50

Nylon 66 resin pellets of molecular weight approximately 42,000 were dissolved in 98.5% formic acid, to yield a 35° C. solution containing 15.5% of the resin. Without delay, this solution was delivered at a flow rate of 250 g/minute to an in-line mixer rotating at 1200 RPM. Simultaneously, a controlled water flow also at 30° C. was delivered to the mixer, the quantity being such as to produce as the effluent a casting resin solution containing 69.0% of formic acid and 12.9% of resin. Temperature of the resulting casting resin solution was 57° C. The casting resin solution was without delay filtered through a 10 $\mu M$ filter to remove visible resin particles, and was then formed into thin films by a doctoring blade with 0.010 inch spacing on glass plates, and in less than 10 seconds immersed into a bath containing formic acid and water, for approximately 5 to 10 minutes. The nylon membranes so formed were washed with flowing water for 1 hour. Two layers of the membrane were oven dried in contact with each other, while restrained to prevent shrinkage of the length and width during drying.

Table VIII shows the product characteristics obtained, for various bath concentrations.

TABLE VIII

| Example No. | Formic acid concentration in bath, % | $K_{L5}$ PSI | $\Delta p^1$ | t mils | Estimated $T_R$ (Ps.) | Absolute particle rating, $\mu M$ | Pore Distribution |
|---|---|---|---|---|---|---|---|
| 47 | 46.4 | 33.3 | 4.4 | 7.6 | $7.7 \times 10^9$ | 0.33 | Uniform |
| 48 | 40 | 33.9 | 5.6 | 7.4 | $2.2 \times 10^{10}$ | 0.30 | Very slightly tapered |
| 49 | 32 | 46.7 | 9.2 | 6.2 | $>10^{30}$ | 0.17 | Slightly tapered |
| 50 | 25 | 76.6 | 19.0 | 6.3 | $>10^{30}$ | 0.13 | Tapered |

[1] Pressure drop in inches of mercury column at air flow rate of 28 feet/minute

EXAMPLES 51 to 57

Membranes were prepared exactly as Examples 47 to 50, except as follows:
Mixer rate was 1600 RPM.
Casting resin solution temperature was 64° C.
Table IX shows the product characteristics.
Examples 56 and 57 are not within the scope of this invention; they are included to illustrate the effect of using bath concentrations of less than about 20% formic acid.

This group of Examples also illustrates the advantages of baths in the range near to 46.5% in producing membranes with minimum pressure drop at a given particle removal rating.

TABLE IX

| Example No. | Formic acid concentration in bath, % | $K_{L5}$ PSI | $\Delta p^1$ | Pressure Ratio[2] | t mils | Estimated $T_R$ (Ps.) | Absolute particle rating, μM | Pore Distribution |
|---|---|---|---|---|---|---|---|---|
| 51 | 50 | 48 | 8.0 | 1.2 | 5.4 | $10^{30}$ | 0.18 | Uniform |
| 52 | 46.5 | 48 | 6.7 | 1.0 | 5.3 | $10^{30}$ | 0.18 | Uniform |
| 53 | 40 | 49 | 10 | 1.4 | 5.2 | $10^{30}$ | 0.18 | Uniform |
| 54 | 32 | 62 | 15 | 1.7 | 5.0 | | | Very slightly tapered |
| 55 | 25 | 72.5 | 19 | 1.8 | 5.2 | | | Slightly skinned |
| 56 | 17 | 78 | 23 | 1.5 | 5.4 | | | Skinned |
| 57 | 12 | 90 | 25 | 1.5 | 5.5 | | | Skinned |

[1] Pressure drop in inches of mercury column at air flow rate of 28 feet/minute
[2] Pressure Ratio = Ratio of the pressure drop of the Example to the pressure drop for products of this invention having equal $K_L$ and thickness

EXAMPLES 58 and 59

These membranes were prepared using the same procedure as Examples 47 to 50 except as follows:
(a) Starting resin concentration was 17%.
(b) Casting resin solution was prepared from 344.7 grams per minute of starting resin solution using as nonsolvent diluent a solution containing 32.8% formic acid in water, delivered to the mixer at a flow rate of 132.1 grams/minute.
(c) Mixer speed was 1900 RPM.
(d) Composition of the casting resin solution was: 12.1% resin, and 67.8% of formic acid.
(e) After filtering through a 10 μM filter, one-half of the solution was further filtered through a filter with an approximate 0.05 to 0.10 μM removal rating. The two portions were then cast as films into a 46.5% formic acid bath, as Examples 58 (filtered 10 μM only) and 59 (filtered 10 μM and ~0.05 to 0.10 μM.) Data for the two, measured on a single thickness of each, are listed in Table X.

TABLE X

| Example | Degree of filtration of casting resin, μM | $K_{L5}$ PSI | $\Delta p$, inches of Hg | t mils | Estimated $T_R$ (Ps.) | Absolute particle rating, μM |
|---|---|---|---|---|---|---|
| 58 | 10 | 33.0 | 7.1 | 7.2 | $9.9 \times 10^8$ | 0.4 |
| 59 | 0.10 | 27.2 | 11.6 | 7.0 | $6.8 \times 10^4$ | 0.65 |

The 11.6 inch pressure drop of Example 59, resulting from the fine filtration step, should be compared with that of a normal product of this invention with the same thickness and $K_{L5}$ values, which would be approximately 3.5 inches of mercury.

EXAMPLES 60 to 64

In these Examples, polyhexamethylene adipamide (Nylon 66) was formed into membrane sheets using a small batch procedure. A 20% starting resin solution was prepared by dissolving resin of molecular weight = 34000 in 98.5% formic acid. A quantity of 500 grams of this solution was heated to 65° C. in a glass jacketed vessel approximately 4 inches inside diameter by 8 inches high, fitted with a two-inch diameter propellor-type agitator, and an externally operated flush valve at its bottom.

A nonsolvent solution was prepared containing 12.77% formic acid, the balance being water. With the agitator rotating at 300 to 500 RPM, 241 g of this nonsolvent solution was pumped into the apparatus, at a constant rate, over a period of 2 minutes, the inlet nozzle being 2 mm inside diameter, and located ¼ inch from the arc described by the rotating propeller. During the last portion of the two minute period, resin was seen to precipitate at the inlet nozzle, all of which subsequently redissolved except for a small quantity of lumps of resin about ⅛ inch in diameter.

About 20 grams of the casting resin solution so formed was withdrawn through the bottom valve, passed through a 42 mesh screen to remove lumps, and without delay spread on a glass plate as a thin film, using a 0.10 inch doctor blade, and the film then promptly immersed in a bath containing formic acid and water, at 25° C.

The membranes were allowed to set for several minutes, then were stripped from the glass plate, washed in water and dried by exposure to infrared heat. The properties of the resulting membranes are shown in Table XI.

TABLE XI

| Example No. | Mixer RPM | Formic acid concentration in bath, % | $K_{L5}$ PSI | $\Delta p^1$ | t mils | Estimated $T_R$ (Ps.) | Absolute particle rating, μM | Pore Distribution |
|---|---|---|---|---|---|---|---|---|
| 60 | 300 | 42.3 | 53 | 7.2 | 3.6 | $>10^{20}$ | >0.25 | Uniform |
| 61 | 400 | 42.3 | 40.8 | 4.5 | 3.8 | $7 \times 10^{11}$ | 0.35 | Uniform |
| 62 | 500 | 42.3 | 38.5 | 22 | 4.0 | $4 \times 10^9$ | 0.40 | Uniform |
| 63 | 400 | 37.5 | 42 | 12 | 3.6 | — | — | Slight taper |
| 64 | 400 | 46.5 | 41.5 | 8.0 | 3.7 | $5 \times 10^{12}$ | 0.34 | Uniform |

[1] Pressure drop in inches of mercury column at air flow rate of 28 feet/minute Examples 60, 61 and 62 illustrate the effect of degree of nucleation on product characteristics. Examples 60 and 61 are properly nucleated, and yield products with favorably low pressure drop, for their removal ratings. In Example 62, the higher rotation rate resulted in a casting solution with too low a degree of nucleation, and as a consequence, a relatively high pressure drop.

EXAMPLES 65 to 68

In these Examples, the polyamide resins shown in Table XII below were formed into membrane sheets using a small batch procedure. A 20% starting resin solution was prepared by dissolving resin of molecular weight = 34000 in 98.5% formic acid. A quantity of 500 grams of this casting solution was held at ambient temperature in a glass jacketed vessel approximately 4 inches inside diameter by 8 inches high, fitted with a two-inch diameter propellor-type agitator, and an externally operated flush valve at its bottom.

As the nonsolvent water was used in Examples 65 to 67, while in Example 68 dimethylformamide was used. With the agitator rotating at 500 RPM, the nonsolvent was pumped into the apparatus at a constant rate over a period of 2 minutes, the inlet nozzle being 2 mm inside diameter, and located ¼ inch from the arc described by the rotating propeller. During the last portion of the two minute period, resin was seen to precipitate at the inlet nozzle, all of which subsequently redissolved except for a small quantity of lumps of resin about ⅛ inch in diameter.

About 20 grams of the casting resin solution so formed was withdrawn through the bottom valve, passed through a 42 mesh screen to remove lumps, and without delay spread on a glass plate as a thin film, using a 0.010 inch doctor blade, and the film then promptly immersed in a bath containing formic acid and water, at ambient temperature.

The membranes were allowed to set for several minutes, then were stripped from the glass plate, washed in water and dried by exposure to infrared heat. The properties of the resulting membranes are shown in Table XII.

TABLE XII

| Example No. | Polyamide resin | Ratio $(CH_2)/(NHCO)$ | Resin concentration in casting solution % | Formic acid[1] concentration in casting solution % | Formic acid[2] concentration in bath % | $K_L$ psi | t mils | $\Delta p^3$ | Remarks |
|---|---|---|---|---|---|---|---|---|---|
| 65 | Nylon 7, poly-7-aminoheptanoamide | 6 | 20 | 63 | 55 | 40.5 | 8.3 | 12.8 | Unskinned |
| 66 | Nylon 69, polyhexamethylene azeleamide | 6.5 | 16 | 62 | 60 | 6.5 | 3.7 | 4.5 | Unskinned |
| 67 | Nylon 610, polyhexamethylene sebacamide | 7 | 18 | 72 | 65 | 22 | 6.2 | 15.5 | Tapered pore |
| 68 | 90/10 Mixture of Nylon 66/Nylon 612 | 5.3 | 21.3 | 64 | 40 | 11.7 | 7.1 | 2.3 | Unskinned |

[1]Nonsolvent is water in Examples 65–67 and dimethyl formamide in Example 68
[2]Balance of bath composition is water
[3]Pressure drop in inches of mercury column at an air flow rate of 28 feet/minute Having regard to the foregoing disclosure, the following is claimed as inventive and patentable embodiments thereof.

1. A process for preparing skinless hydrophilic alcohol-insoluble polyamide membranes that are readily wetted by water which comprises preparing a solution of an alcohol-insoluble polyamide resin selected from the group consisting of polyhexamethylene adipamide, polyhexamethylene sebacate, and poly-ε-caprolactam in a polyamide resin solvent, inducing nucleation of the solution by controlled addition to the solution of a nonsolvent for the polyamide resin, under controlled conditions of concentration, temperature, addition rate, and degree of agitation to obtain a visible precipitate of polyamide resin particles, thereby forming a casting solution; spreading the casting solution on a substrate to form a thin film thereof on the substrate; contacting and diluting the film of casting solution with a nonsolvent liquid for the polyamide resin, thereby precipitating polyamide resin from the casting solution in the form of a thin skinless membrane; washing the membrane to remove solvent; and drying the resulting membrane.

2. A process according to claim 1 in which precipitated polyamide resin particles are redissolved before spreading the casting solution on a substrate.

3. A process according to claim 1 in which precipitated polyamide resin particles are filtered out before spreading the casting solution on a substrate.

4. A process according to claim 1 in which part of the precipitated polyamide resin particles are redissolved and part are filtered out before spreading the casting solution on a substrate.

5. A process according to claim 1 in which the nonsolvent used to contact and dilute the casting solution is a mixture of solvent and nonsolvent liquids containing a substantial proportion of the solvent liquid, but less than the proportion in the casting solution.

6. A process according to claim 1 in which the polyamide resin is polyhexamethylene adipamide.

7. A process according to claim 1 in which the polyamide resin is poly-ε-caprolactam.

8. A process according to claim 1 in which the polyamide resin is polyhexamethylene sebacamide.

9. A process according to claim 1 in which the polyamide resin is polyhexamethylene adipamide, the solvent for the polyamide resin solution is formic acid, and the nonsolvent added for dilution is water.

10. A process according to claim 1, in which the polyamide resin solution film is contacted with the nonsolvent by immersing the film carried on the substrate in a bath of nonsolvent liquid.

11. A process according to claim 10 in which the bath comprises both solvent and nonsolvent liquids.

12. A process according to claim 11 in which the bath comprises an amount within the range from about 20% to about 55% of a solvent for the resin; washing the resulting membrane substantially free of solvent; and drying the membrane.

13. A process according to claim 9 in which the polyamide resin is polyhexamethylene adipamide, the solvent is formic acid, and the nonsolvent is water, and the polyamide resin concentration in the casting solution is within the range from about 10 to about 18% by weight, and the formic acid concentration is within the range from about 63 to about 72%.

14. A process according to claim 13 in which the polyamide resin concentration of the casting solution is within the range from about 12 to about 18%, and the nonsolvent is added at a fixed intensity of mixing.

15. A process according to claim 1 in which the casting resin is continuously spread onto the substrate, the thin film of casting solution is continuously immersed in a bath of nonsolvent liquid, and the bath is maintained at a substantially constant composition with respect to nonsolvent and solvent by continuous addition of nonsolvent to the bath in a quantity to compensate for solvent diffusion into the bath from the thin film of casting solution.

16. A process according to claim 15 in which the substrate is a nonporous synthetic polymer film having a surface that is wetted by the casting solution and the bath.

17. A process according to claim 15 in which the substrate is a porous web having an open structure which is wetted and impregnated by the casting solution, thereby forming a membrane film having the porous web incorporated as a part thereof.

18. A process according to claim 17 in which the substrate is a fibrous polyester sheet.

19. A process according to claim 15 in which the substrate is a porous web which is not wetted by the casting solution, thereby forming a membrane film having the porous web attached to one surface thereof.

20. A process according to claim 1 in which the polyamide resin solution has a viscosity within the range from about 5,000 centipoises to about 50,000 centipoises at the operating temperature.

21. A process according to claim 1 in which the casting and precipitating temperatures are within the range from about 10° C. to the boiling temperature of the lowest boiling solvent or nonsolvent component present.

22. A process according to claim 1 in which the casting resin solution is clear, and free from suspended material, before being spread upon the substrate to form a film.

23. A process according to claim 1 in which the membrane is stripped from the support after washing and before drying.

24. A process according to claim 1 in which the substrate is not stripped from the polyamide resin membrane before drying, and after drying remains attached to the polyamide resin membrane.

25. A process according to claim 1 in which the substrate is of polypropylene resin.

26. A process according to claim 1 in which the substrate is of polyester resin.

27. A process according to claim 1 in which the casting solution has a viscosity within the range from about 500 centipoises to about 100,000 centipoises at the temperature existing at the time it is cast as a film.

28. A process according to claim 1 in which the casting solution has a viscosity within the range from about 500 centipoises to about 5000 centipoises at the temperature existing at the time it is cast as a film.

29. A process for preparing skinless hydrophilic alcohol-insoluble polyhexamethylene adipamide resin membranes having a substantially zero contact angle with water and having pores that are substantially uniform from surface to surface which comprises preparing a flowable solution of the alcohol-insoluble polyhexamethylene adipamide resin in a concentration within the range from about 10% to about 18% by weight in an aqueous formic acid solution containing from about 63% to about 72% formic acid by weight; inducing nucleation of the resin solution by adding water thereto while controlling resin and formic acid concentration, temperature, rate of addition of water and degree of agitation to obtain a visible precipitate of resin particles, thereby forming a casting solution; spreading the casting solution on a polyester resin substrate to form a thin film of resin solution thereon; contacting and diluting the film of casting resin solution with an aqueous solution containing from 37 to 55% formic acid and thereby precipitating the polyamide resin from the casting resin solution as a thin skinless hydrophilic membrane; washing the membrane to remove solvent; and drying the membrane.

30. A process according to claim 29 in which the membrane is stripped from the support after washing and before drying.

31. A process according to claim 29 in which precipitated polyamide resin particles are redissolved before spreading the casting solution on a substrate.

32. A process according to claim 29 in which precipitated polyamide resin particles are filtered out before spreading the casting solution on a substrate.

33. A process according to claim 29 in which part of the precipitated polyamide resin particles are redissolved and part are filtered out before spreading the casting solution on a substrate.

34. A hydrophilic skinless alcohol-insoluble polyamide resin membrane sheet of alcohol-insoluble hydrophobic polyamide resin selected from the group consisting of polyhexamethylene adipamide, polyhexamethylene sebacate, and poly-ε-caprolactam, and capable when completely immersed in water of being wetted through within no more than one second, and reverting when heated to a temperature just below the softening temperature of the membrane to a hydrophobic material which is no longer wetted by water.

35. A hydrophilic skinless alcohol-insoluble polyamide resin membrane sheet according to claim 34 having through pores extending from surface to surface that are substantially uniform in shape and size.

36. A hydrophilic skinless alcohol-insoluble polyamide resin membrane sheet according to claim 34 having through pores extending from surface to surface that are tapered, wider at one surface and narrowing towards the other surface of the membrane sheet.

37. A hydrophilic skinless alcohol-insoluble polyamide resin membrane sheet according to claim 34 having absolute particle removal ratings of 0.10 $\mu M$ to 5 $\mu M$.

38. A hydrophilic skinless alcohol-insoluble polyamide resin membrane sheet according to claim 34 in which the polyamide resin is polyhexamethylene adipamide.

39. A hydrophilic skinless alcohol-insoluble polyamide resin membrane sheet according to claim 34 in which the polyamide resin is poly-ε-caprolactam.

40. A hydrophilic skinless alcohol-insoluble polyamide resin membrane sheet according to claim 34 in which the polyamide resin is polyhexamethylene sebacamide.

41. A hydrophilic skinless alcohol-insoluble polyamide resin membrane sheet according to claim 34 having two membrane layers adherent to each other and forming a single membrane sheet with particle removal characteristics superior to those of the individual membrane layers.

42. A hydrophilic skinless alcohol-insoluble polyamide resin membrane sheet according to claim 41 in which the two membrane layers have the same porosities.

43. A hydrophilic skinless alcohol-insoluble polyamide resin membrane sheet according to claim 41 in which the two membrane layers have differing porosities.

44. A hydrophilic skinless alcohol-insoluble polyamide resin membrane sheet according to claim 41 in which the membranes have tapered pores.

45. A hydrophilic skinless alcohol-insoluble polyamide resin membrane sheet according to claim 41 in which the membranes have uniform pores.

46. A hydrophilic skinless alcohol-insoluble polyamide resin membrane sheet according to claim 41 in which the membranes are supported.

47. A hydrophilic skinless alcohol-insoluble polyamide resin membrane sheet according to claim 41 in which the membranes are unsupported.

48. A hydrophilic skinless alcohol-insoluble polyamide resin membrane sheet according to claim 34 having a thickness within the range from about 0.025 to about 0.8 mm.

49. A filter element comprising a hydrophilic skinless alcohol-insoluble polyamide resin membrane sheet according to claim 34 formed in a tubular configuration with the ends of the tube sealed to end caps of which at least one end cap has a central aperture giving access to the interior of the tube, and with the sides of the sheet lapped and sealed together, all seals being fluid-tight.

50. A filter element according to claim 49 in which the sheet is corrugated.

51. A filter element according to claim 49 in which at least one of the exterior faces of the sheet is adhered to a porous support layer.

52. A filter element according to claim 51 in which both the membrane sheet and the support layer are corrugated.

53. A filter element according to claim 49 comprising a multilayer membrane sheet, the layers being adhered together as one sheet.

54. A filter element according to claim 53 in which the layers of membrane are separated by a porous support layer to which each membrane layer is adhered.

55. A filter element according to claim 49 in which the end caps are of polyester resin and the filter element including the end caps is hydrophilic and rapidly wetted by water.

56. A filter element according to claim 55 in which the polyester is polybutylene glycol terephthalate.

57. A filter element according to claim 55 in which the polyester is polyethylene glycol terephthalate.

58. A process for preparing multilayer skinless hydrophilic alcohol-insoluble polyamide membranes that are readily wetted by water which comprises preparing a solution of an alcohol-insoluble polyamide resin selected from the group consisting of polyhexamethylene adipamide, polyhexamethylene sebacate, and poly-ϵ-caprolactam in a polyamide resin solvent; inducing nucleation of the solution by controlled addition to the solution of a nonsolvent for the polyamide resin, under controlled conditions of concentration, temperature, addition rate, and degree of agitation to obtain a visible precipitate of polyamide resin particles, thereby forming a casting solution; spreading the casting solution on a substrate to form a thin film thereof on the substrate; contacting and diluting the film of casting solution with a nonsolvent liquid for the polyamide resin, thereby precipitating polyamide resin from the casting solution in the form of a thin skinless membrane; washing the membrane to remove solvent; placing the washed membrane while still wet in contact with at least one other wet washed membrane; and then drying the juxtaposed membranes while maintaining such contact, thereby obtaining a multilayer membrane in which the separate membranes are integral layers thereof.

59. A process according to claim 58 in which the separate membranes are stripped from the substrate before drying.

60. A process according to claim 58 in which the separate membranes are dried while supported on the substrate, which thereby becomes an integral part of the multilayer membrane.

61. A process according to claim 60 in which the substrate is a porous fibrous web.

62. A process according to claim 61 in which the fibrous web is of polyester resin.

63. A process according to claim 61 in which the fibrous web is of polypropylene resin.

64. A process according to claim 58 in which the polyamide resin is polyhexamethylene adipamide.

65. A process according to claim 58 in which the polyamide resin is poly-ϵ-caprolactam.

66. A process according to claim 58 in which the polyamide resin is polyhexamethylene sebacamide.

67. A process according to claim 58 in which the membranes are dried under restraint to limit dimensional change.

68. A process according to claim 58 in which the membranes are corrugated and then dried.

69. A multilayer hydrophilic skinless alcohol-insoluble polyamide resin membrane sheet of alcohol-insoluble hydrophobic polyamide resin selected from the group consisting of polyhexamethylene adipamide, polyhexamethylene sebacate, and poly-ϵ-caprolactam, and capable when completely immersed in water of being wetted through within no more than one second, and reverting when heated to a temperature just below the softening temperature of the membrane to a hydrophobic material which is no longer wetted by water, and having at least two membrane layers integrally adhered together.

70. A multilayer hydrophilic skinless alcohol-insoluble polyamide resin membrane sheet according to claim 69 in which the membrane layers are supported on a substrate.

71. A multilayer hydrophilic skinless alcohol-insoluble polyamide resin membrane sheet according to claim 70 in which the substrate is a porous fibrous web.

72. A multilayer hydrophilic skinless alcohol-insoluble polyamide resin membrane sheet according to claim 70 in which the fibrous web is of polyester resin.

73. A multilayer hydrophilic skinless alcohol-insoluble polyamide resin membrane sheet according to claim 70 in which the fibrous web is of polypropylene resin.

74. A multilayer hydrophilic skinless alcohol-insoluble polyamide resin membrane sheet according to claim 70 in which the polyamide resin is polyhexamethylene adipamide.

75. A multilayer hydrophilic skinless alcohol-insoluble polyamide resin membrane sheet according to claim 70 in which the polyamide resin is poly-ϵ-caprolactam.

76. A multilayer hydrophilic skinless alcohol-insoluble polyamide resin membrane sheet according to claim 70 in which the polyamide resin is polyhexamethylene sebacamide.

77. A process for preparing skinless hydrophilic alcohol-insoluble polyamide membranes that are readily wetted by water which comprises preparing a solution in a polyamide solvent of an alcohol-insoluble polyamide resin having a ratio $CH_2:NHCO$ of methylene $CH_2$ to amide NHCO groups within the range from about 5:1 to about 7:1; inducing nucleation of the solution by controlled addition to the solution of a nonsolvent for the polyamide resin, under controlled conditions of concentration, temperature, addition rate, and degree of agitation to obtain a visible precipitate of polyamide resin particles, thereby forming a casting solution; spreading the casting solution on a substrate to form a thin film thereof on the substrate; contacting and diluting the film of casting solution with a nonsolvent liquid for the polyamide resins, thereby precipitating polyamide resin from the casting solution in the form of a thin skinless hydrophilic membrane; washing the membrane to remove solvent; and drying the resulting membrane.

78. A process according to claim 77 in which precipitated polyamide resin particles are redissolved before spreading the casting solution on a substrate.

79. A process according to claim 77 in which precipitated polyamide resin particles are flitered out before spreading the casting solution on a substrate.

80. A process according to claim 77 in which part of the precipitated polyamide resin particles are redissolved and part are filtered out before spreading the casting solution on a substrate.

81. A process according to claim 77 in which the nonsolvent used to contact and dilute the casting solution is a mixture of solvent and nonsolvent liquids containing a substantial proportion of the solvent liquid, but less than the proportion in the casting solution.

82. A process according to claim 77 in which the polyamide resin is polyhexamethylene adipamide.

83. A process according to claim 77 in which the polyamide resin is poly-ϵ-caprolactam.

84. A process according to claim 77 in which the polyamide resin is polyhexamethylene sebacamide.

85. A process according to claim 77 in which the polyamide resin is poly-7-aminoheptanoamide.

86. A process according to claim 77 in which the polyamide resin is polyhexamethylene azeleamide.

87. A process for preparing skinless hydrophilic alcohol-insoluble polyamide membranes that are readily wetted by water which comprises preparing a solution in a polyamide solvent of a mixture of polyamide resins of which at least one is an alcohol-insoluble polyamide resin having a $CH_2:NHCO$ ratio of methylene $CH_2$ to amide NHCO groups within the range from about 5:1 to about 7:1; and at least one is an alcohol-insoluble polyamide resin having a $CH_2:NHCO$ ratio exceeding 7:1, in proportions such that the average $CH_2:NHCO$ ratio is within the range from about 5:1 to about 7:1; inducing nucleation of the solution by controlled addition to the solution of a nonsolvent for the polyamide resin, under controlled conditions of concentration, temperature, addition rate, and degree of agitation to obtain a visible precipitate of polyamide resin particles, thereby forming a casting solution; spreading the casting solution on a substrate to form a thin film thereof on the substrate; contacting and diluting the film of casting solution with a nonsolvent liquid for the polyamide resins, thereby precipitating polyamide resin from the casting solution in the form of a thin skinless hydrophilic membrane; washing the membrane to remove solvent; and drying the resulting membrane.

88. A process according to claim 87 in which the polyamide resin having a $CH_2:NHCO$ ratio exceeding 7:1 is polyhexamethylene undecanediamide.

89. A process according to claim 87 in which the polyamide resin having a $CH_2:NHCO$ ratio exceeding 7:1 is poly-11-aminoundecanoic acid.

90. A process according to claim 77 in which the polyamide resin is polyhexamethylene adipamide, the solvent for the polyamide resin solution is formic acid, and the nonsolvent added for dilution is water.

91. A process according to claim 77 in which the polyamide resin solution film is contacted with the nonsolvent by immersing the film carried on the substrate in a bath of nonsolvent liquid.

92. A process according to claim 91 in which the bath comprises both solvent and nonsolvent liquids.

93. A process according to claim 92 in which the bath comprises an amount within the range from about 20% to about 55% of a solvent for the resin; washing the resulting membrane substantially free of solvent; and drying the membrane.

94. A process according to claim 90 in which the polyamide resin is polyhexamethylene adipamide, the solvent is formic acid, and the nonsolvent is water, and the polyamide resin concentration in the casting solution is within the range from about 10 to about 18% by weight, and the formic acid concentration is within the range from about 63 to about 72%.

95. A process according to claim 94 in which the polyamide resin concentration of the casting solution is within the range from about 12 to about 18%, and the nonsolvent is added at a fixed intensity of mixing.

96. A process according to claim 77 in which the solvent is formic acid, and the polyamide resin concentration in the casting solution is within the range from about 10 to about 22% by weight, and the formic acid concentration is within the range from about 60 to about 72%.

97. A process according to claim 77 in which the casting resin is continuously spread onto the substrate, the thin film of casting solution is continuously immersed in a bath of nonsolvent liquid, and the bath is maintained at a substantially constant composition with respect to nonsolvent and solvent by continuous addition of nonsolvent to the bath in a quantity to compensate for solvent diffusion into the bath from the thin film of casting solution.

98. A process according to claim 97 in which the substrate is a nonporous synthetic polymer film having a surface that is wetted by the casting solution and the bath.

99. A process according to claim 97 in which the substrate is a porous web having an open structure which is wetted and impregnated by the casting solution, thereby forming a membrane film having the porous web incorporated as a part thereof.

100. A process according to claim 99 in which the substrate is a fibrous polyester sheet.

101. A process according to claim 97 in which the substrate is a porous web which is not wetted by the casting solution, thereby forming a membrane film having the porous web attached to one surface thereof.

102. A process according to claim 77 in which the polyamide resin solution has a viscosity within the range from about 5,000 centipoises to about 50,000 centipoises at the operating temperature.

103. A process according to claim 77 in which the casting and precipitating temperatures are within the range from about 10° C. to the boiling temperature of the lowest boiling solvent or nonsolvent component present.

104. A process according to claim 77 in which the casting resin solution is clear, and free from suspended material, before being spread upon the substrate to form a film.

105. A process according to claim 77 in which the membrane is stripped from the support after washing and before drying.

106. A process according to claim 77 in which the substrate is not stripped from the polyamide resin membrane before drying, and after drying remains attached to the polyamide resin membrane.

107. A process according to claim 77 in which the substrate is of polypropylene resin.

108. A process according to claim 77 in which the substrate is of polyester resin.

109. A process according to claim 77 in which the casting solution has a viscosity within the range from about 500 centipoises to about 100,000 centipoises at the temperature existing at the time it is cast as a film.

110. A process according to claim 77 in which the casting solution has a viscosity within the range from about 500 centipoises to about 5000 centipoises at the temperature existing at the time it is cast as a film.

111. A process for preparing skinless hydrophilic alcohol-insoluble polyamide resin membranes having pores that are substantially uniform from surface to surface which comprises preparing a flowable solution of the alcohol-insoluble polyamide resin in a concentration within the range from about 10% to about 22% by weight in an aqueous formic acid solution containing from about 60% to about 72% formic acid by weight; inducing nucleation of the resin solution by adding water thereto while controlling resin and formic acid concentration, temperature, rate of addition of water and degree of agitation to obtain a visible precipitate of resin particles, thereby forming a casting solution; spreading the casting solution on a polyester resin substrate to form a thin film of resin solution thereon; contacting and diluting the film of casting resin solution with an aqueous solution containing from 37 and 55% formic acid and thereby precipitating the polyamide resin from the casting resin solution as a thin skinless hydrophilic membrane; washing the membrane to remove solvent; and drying the membrane.

112. A process according to claim 111 in which the membrane is stripped from the support after washing and before drying.

113. A process according to claim 111 in which precipitated polyamide resin particles are redissolved before spreading the casting solution on a substrate.

114. A process according to claim 111 in which precipitated polyamide resin particles are filtered out before spreading the casting solution on a substrate.

115. A process according to claim 111 in which part of the precipitated polyamide resin particles are redissolved and part are filtered out before spreading the casting solution on a substrate.

116. A hydrophilic skinless alcohol-insoluble polyamide resin membrane sheet of alcohol-insoluble hydrophobic polyamide resin having a ratio $CH_2$:NHCO of methylene $CH_2$ to amide NHCO groups within the range from about 5:1 to about 7:1; capable when completely immersed in water of being wetted through within no more than one second, and reverting when heated to a temperature just below the softening temperature of the membrane to a hydrophobic material which is no longer wetted by water.

117. A hydrophilic skinless alcohol-insoluble polyamide resin membrane sheet according to claim 116 having through pores extending from surface to surface that are substantially uniform in shape and size.

118. A hydrophilic skinless alcohol-insoluble polyamide resin membrane sheet according to claim 116 having through pores extending from surface to surface that are tapered, wider at one surface and narrowing towards the other surface of the membrane sheet.

119. A hydrophilic skinless alcohol-insoluble polyamide resin membrane sheet according to claim 116 having absolute particle removal ratings of 0.10 $\mu M$ to 5 $\mu M$.

120. A hydrophilic skinless alcohol-insoluble polyamide resin membrane sheet according to claim 116 in which the polyamide resin is polyhexamethylene adipamide.

121. A hydrophilic skinless alcohol-insoluble polyamide resin membrane sheet according to claim 116 in which the polyamide resin is poly-$\epsilon$-caprolactam.

122. A hydrophilic skinless alcohol-insoluble polyamide resin membrane sheet according to claim 116 in which the polyamide resin is polyhexamethylene sebacamide.

123. A hydrophilic skinless alcohol-insoluble polyamide resin membrane sheet according to claim 116 in which the polyamide resin is poly-7-aminoheptanoamide.

124. A hydrophilic skinless alcohol-insoluble polyamide resin membrane sheet according to claim 116 in which the polyamide resin is polyhexamethylene azeleamide.

125. A hydrophilic skinless alcohol-insoluble polyamide resin membrane sheet according to claim 116 having two membrane layers adherent to each other and forming a single membrane sheet with particle removal characteristics superior to those of the individual membrane layers.

126. A hydrophilic skinless alcohol-insoluble polyamide resin membrane sheet according to claim 125 in which the two membrane layers have the same porosities.

127. A hydrophilic skinless alcohol-insoluble polyamide resin membrane sheet according to claim 125 in which the two membrane layers have differing porosities.

128. A hydrophilic skinless alcohol-insoluble polyamide resin membrane sheet according to claim 125 in which the membranes have tapered pores.

129. A hydrophilic skinless alcohol-insoluble polyamide resin membrane sheet according to claim 125 in which the membranes have uniform pores.

130. A hydrophilic skinless alcohol-insoluble polyamide resin membrane sheet according to claim 125 in which the membranes are supported.

131. A hydrophilic skinless-alcohol insoluble polyamide resin membrane sheet according to claim 125 in which the membranes are unsupported.

132. A hydrophilic skinless alcohol-insoluble polyamide resin membrane sheet according to claim 116 having a thickness within the range from about 0.025 to about 0.8 mm.

133. A filter element comprising a hydrophilic skinless alcohol-insoluble polyamide resin membrane sheet according to claim 116 formed in a tubular configuration with the ends of the tube sealed to end caps of which at least one end cap has a central aperture giving access to the interior of the tube, and with the sides of the sheet lapped and sealed together, all seals being fluid-tight.

134. A filter element according to claim 133 in which the sheet is corrugated.

135. A filter element according to claim 133 in which at least one of the exterior faces of the sheet is adhered to a porous support layer.

136. A filter element according to claim 135 in which both the membrane sheet and the support layer are corrugated.

137. A filter element according to claim 136 comprising a multilayer membrane sheet, the layers being adhered together as one sheet.

138. A filter element according to claim 137 in which the layers of membrane are separated by a porous support layer to which each membrane layer is adhered.

139. A filter element according to claim 133 in which the end caps are of polyester resin and the filter element including the end caps is hydrophilic and rapidly wetted by water.

140. A filter element according to claim 139 in which the polyester is polybutylene glycol terephthalate.

141. A filter element according to claim 139 in which the polyester is polyethylene glycol terephthalate.

142. A process for preparing multilayer skinless hydrophilic alcohol-insoluble polyamide membranes that are readily wetted by water which comprises preparing a solution in a polyamide resin solvent of an alcohol-insoluble polyamide resin having a ratio $CH_2:NHCO$ of methylene $CH_2$ to amide NHCO groups within the range from about 5:1 to about 7:1; inducing nucleation of the solution by controlled addition to the solution of a nonsolvent for the polyamide resin, under controlled conditions of concentration, temperature, addition rate, and degree of agitation to obtain a visible precipitate of polyamide resin particles, thereby forming a casting solution; spreading the casting solution on a substrate to form a thin film thereof on the substrate; contacting and diluting the film of casting solution with a nonsolvent liquid for the polyamide resin, thereby precipitating polyamide resin from the casting solution in the form of a thin skinless membrane; washing the membrane to remove solvent; placing the washed membrane while still wet in contact with at least one other wet washed membrane; and then drying the juxtaposed membranes while maintaining such contact, thereby obtaining a multilayer membrane in which the separate membranes are integral layers thereof.

143. A process according to claim 142 in which the separate membranes are stripped from the substrate before drying.

144. A process according to claim 142 in which the separate membranes are dried while supported on the substrate, which thereby becomes an integral part of the multilayer membrane.

145. A process according to claim 144 in which the substrate is a porous fibrous web.

146. A process according to claim 145 in which the fibrous web is of polyester resin.

147. A process according to claim 145 in which the fibrous web is of polypropylene resin.

148. A process according to claim 142 in which the polyamide resin is polyhexamethylene adipamide.

149. A process according to claim 142 in which the polyamide resin is poly-ε-caprolactam.

150. A process according to claim 142 in which the polyamide resin is polyhexamethylene sebacamide.

151. A process according to claim 142 in which the polyamide resin is poly-7-aminoheptanoamide.

152. A process according to claim 142 in which the polyamide resin is polyhexamethylene azeleamide.

153. A process according to claim 142 in which the membranes are dried under restraint to limit dimensional change.

154. A process according to claim 142 in which the membranes are corrugated and then dried.

155. A multilayer hydrophilic skinless alcohol-insoluble polyamide resin membrane sheet of alcohol-insoluble hydrophobic polyamide resin having a ratio $CH_2:NHCO$ of methylene $CH_2$ to amide NHCO groups within the range from about 5:1 to about 7:1, capable when completely immersed in water of being wetted through within no more than one second, and reverting when heated to a temperature just below the softening temperature of the membrane to a hydrophobic material which is no longer wetted by water, and having at least two membrane layers integrally adhered together.

156. A multilayer hydrophilic skinless alcohol-insoluble polyamide resin membrane sheet according to claim 155 in which the membrane layers are supported on a substrate.

157. A multilayer hydrophilic skinless alcohol-insoluble polyamide resin membrane sheet according to claim 156 in which the substrate is a porous fibrous web.

158. A multilayer hydrophilic skinless alcohol-insoluble polyamide resin membrane sheet according to claim 156 in which the fibrous web is of polyester resin.

159. A multilayer hydrophilic skinless alcohol-insoluble polyamide resin membrane sheet according to claim 156 in which the fibrous web is of polypropylene resin.

160. A multilayer hydrophilic skinless alcohol-insoluble polyamide resin membrane sheet according to claim 155 in which the polyamide resin is polyhexamethylene adipamide.

161. A multilayer hydrophilic skinless alcohol-insoluble polyamide resin membrane sheet according to claim 155 in which the polyamide resin is poly-ε-caprolactam.

162. A multilayer hydrophilic skinless alcohol-insoluble polyamide resin membrane sheet according to claim 155 in which the polyamide resin is polyhexamethylene sebacamide.

* * * * *

REEXAMINATION CERTIFICATE (2976th)
United States Patent [19]
Pall

[11] B1 4,340,479
[45] Certificate Issued Aug. 27, 1996

[54] PROCESS FOR PREPARING HYDROPHILIC POLYAMIDE MEMBRANE FILTER MEDIA AND PRODUCT

[75] Inventor: David B. Pall, Roslyn Estates, N.Y.

[73] Assignee: Pall Corporation, Glen Cove, N.Y.

Reexamination Request:
No. 90/004,007, Oct. 20, 1995

Reexamination Certificate for:
Patent No.: 4,340,479
Issued: Jul. 20, 1982
Appl. No.: 198,569
Filed: Oct. 20, 1980

Related U.S. Application Data

[63] Continuation-in-part of Ser. No. 905,698, May 15, 1978, abandoned.
[51] Int. Cl.$^6$ .................................................. B01D 71/56
[52] U.S. Cl. ................ 210/490; 210/500.38; 210/493.2; 264/41
[58] Field of Search ............................... 210/490, 493.2, 210/500.38; 264/41, 49

[56] References Cited

U.S. PATENT DOCUMENTS

| | | |
|---|---|---|
| 3,457,339 | 7/1969 | Pall . |
| 3,615,024 | 10/1971 | Michaels . |
| 3,876,738 | 4/1975 | Marinaccio . |
| 4,340,479 | 7/1982 | Pall . |

OTHER PUBLICATIONS

Decision, U.S. Court of Appeals for Federal Circuit, Nos. 91–1393, –1394, and –1409, Pall Corp. v. Micron Separations, Inc., decided Sep. 26, 1995.

Decision by Judge William Young, U.S. District Court, District of Massachusetts, Civil Action No. 86–1427–Y, Pall Corp. v. Micron Separations, Inc., dated Jun. 5 and Jun. 6, 1991.

Pall Corporation's Memorandum in Opposition to Micron Separations, Inc.'s "Renewed Motion for Summary Judgement . . . ", dated Dec. 4, 1994, in Civil Action 94–11377–WGY.

Decision of Technical Board of Appeal 3.4.2 of the European Patent Office of Sep. 8, 1993, in regard to European Patent No. 0 005 536, the European equivalent to Pall 4,340,479.

*Primary Examiner*—Frank Spear

[57] ABSTRACT

A process is provided for preparing skinless hydrophilic alcohol-insoluble polyamide membranes by preparing a solution in a polyamide solvent of an alcohol-insoluble polyamide resin having a ratio $CH_2$:NHCO of methylene $CH_2$ to amide NHCO groups within the range from about 5:1 to about 7:1 inducing nucleation of the solution by controlled addition to the solution of a nonsolvent for the polyamide resin, under controlled conditions of concentration, temperature, addition rate, and degree of agitation to obtain a visible precipitate of polyamide resin particles which may or may not thereafter partially or completely redissolve, thereby forming a casting solution; spreading the casting solution on a substrate to form a thin film thereof on the substrate; contacting and diluting the film of casting solution with a mixture of solvent and nonsolvent liquids containing a substantial proportion of the solvent liquid, but less than the proportion in the casting solution, thereby precipitating polyamide resin from the casting solution in the form of a thin skinless hydrophilic membrane; and washing and drying the resulting membrane; the alcohol-insoluble polyamide membranes obtained by this process have the unusual property of being hydrophilic, i.e., readily wetted by water, have absolute particle removal capabilities of the order of 0.1 to 5 μM or more, and are useful as filter media, particularly for producing bacterially sterile filtrates.

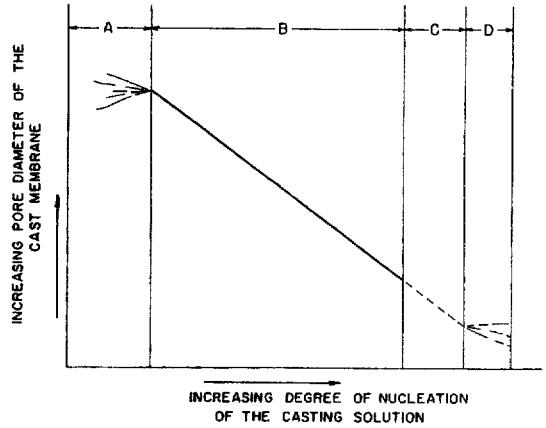

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–162 is confirmed.

* * * * *